(12) United States Patent
Schlanger

(10) Patent No.: US 8,246,119 B2
(45) Date of Patent: Aug. 21, 2012

(54) VEHICLE WHEEL SPOKE CONNECTION

(76) Inventor: Raphael Schlanger, Wilton, CT (US)

( * ) Notice: Subject to any disclaimer, the term of this patent is extended or adjusted under 35 U.S.C. 154(b) by 350 days.

(21) Appl. No.: 12/462,628

(22) Filed: Aug. 6, 2009

(65) Prior Publication Data

US 2010/0033006 A1    Feb. 11, 2010

Related U.S. Application Data

(60) Provisional application No. 61/188,149, filed on Aug. 7, 2008.

(51) Int. Cl.
  *B60B 21/06*    (2006.01)
(52) U.S. Cl. ............................. 301/57; 301/59; 301/104
(58) Field of Classification Search .............. 301/55–59, 301/61, 104
  See application file for complete search history.

(56) References Cited

U.S. PATENT DOCUMENTS

| | | | | |
|---|---|---|---|---|
| 6,899,401 | B2 * | 5/2005 | Schlanger | 301/59 |
| 7,192,097 | B2 * | 3/2007 | Schlanger | 301/57 |
| 2004/0155518 | A1 * | 8/2004 | Schlanger | 301/58 |
| 2005/0067881 | A1 * | 3/2005 | Schlanger | 301/59 |
| 2007/0257548 | A1 * | 11/2007 | Schlanger | 301/58 |

* cited by examiner

*Primary Examiner* — Jason Bellinger

(57) ABSTRACT

A wheel, having a peripheral wheel rim, a central hub with a central axle and an outer flange, a plurality of spokes extending between the rim and hub, a connecting element connected to at least one of the spokes, and a bracing element connected to the connecting element. The spokes have a first portion connected to the rim and a second portion opposed to the first portion and connected to the hub and a span portion between the rim and hub. The spoke is a generally slender element with a longitudinal axis and also has a tensile axis of applied tensile load along the span portion. The bracing element includes at least a portion of at least one of the rim and hub. The connecting element includes a first portion and a second portion, with the first portion integrally joined to the second portion at a joining interface. This integral joinder of the first portion and second portion of the connecting element serves to at least one of retain and engage the spoke to the connecting element.

32 Claims, 15 Drawing Sheets

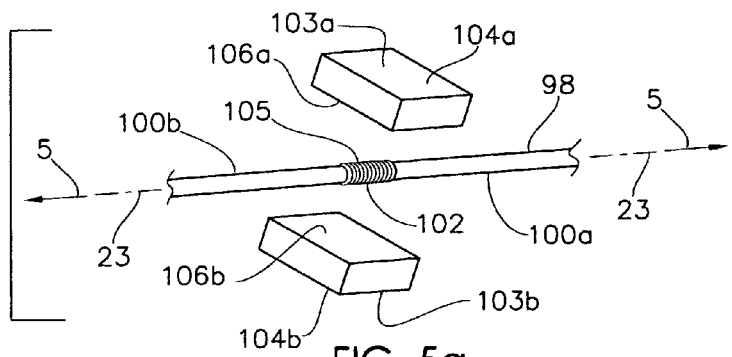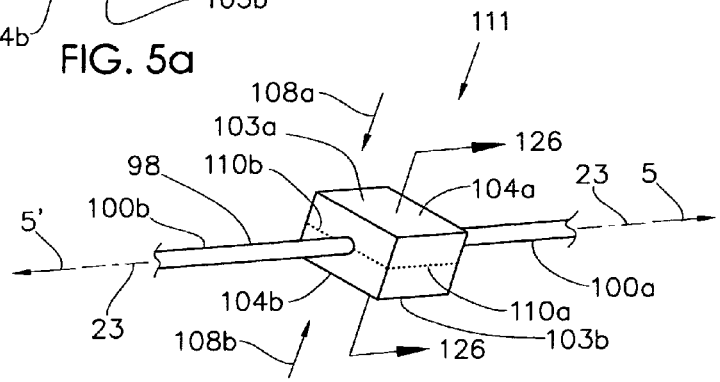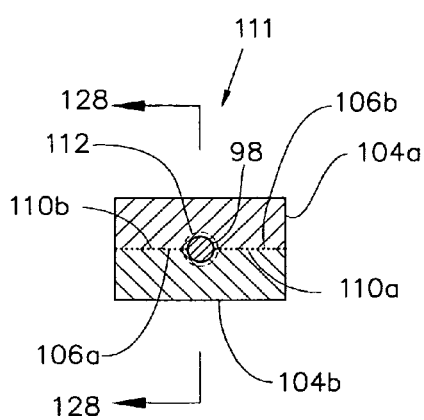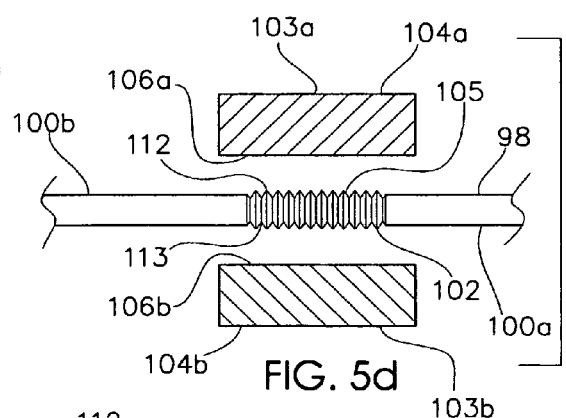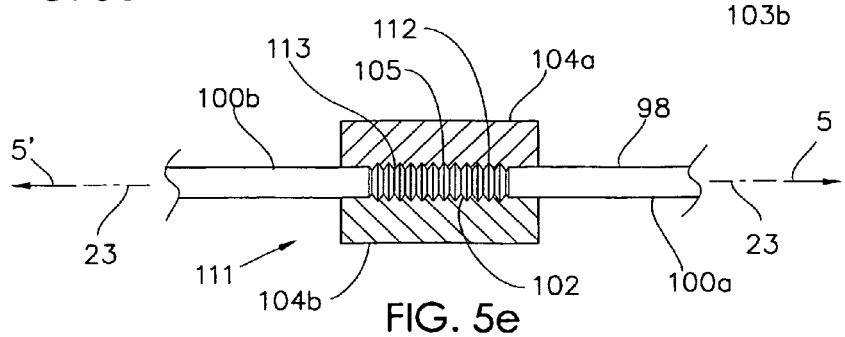

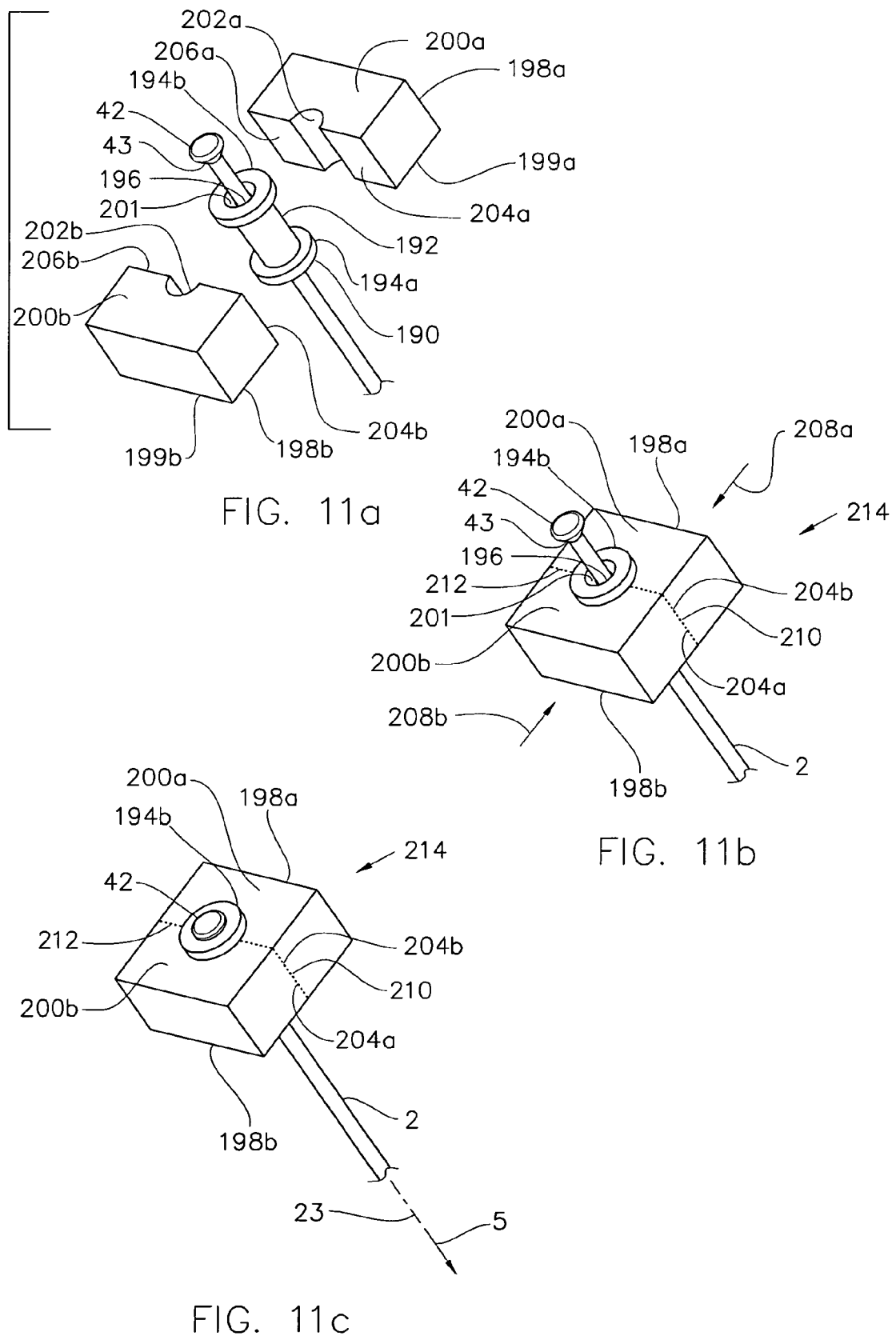

VEHICLE WHEEL SPOKE CONNECTION

CROSS-REFERENCE TO RELATED APPLICATION

This application claims priority of U.S. provisional patent application 61/188,149, filed Aug. 7, 2008, and entitled "VEHICLE WHEEL SPOKE CONNECTION".

BACKGROUND OF THE INVENTION (1) Field of the Invention

The present invention relates to an improved connection system for a vehicle wheel spokes.

(2) Description of the Related Art

Heretofore, the vast majority of bicycle wheels have been constructed using steel wire spokes that are connected, at their inner end, to a central hub component and, at their outer end, to a metallic rim hoop. The spokes are generally of steel construction while the hub and rim are commonly of aluminum or steel construction. The individual spokes, hub and rim are each formed as separate components that are then joined together with mechanical connections.

The manufacture of the hub component is an expensive process. Some hub shells are machined from aluminum billet while others are cast or forged and subsequently machined. This machining operation generally requires at least three machining setups: first the cylindrical portions of the hub are turned on lathe, second, the spoke holes in one hub flange are drilled in a rotary index operation, and third, the opposite hub flange is drilled in a separate rotary index operation as well. This multi-step machining process adds considerable expense to the manufacture of the hub shell component.

The tensile forces within the spoke create relatively high stresses at their connection points and these connection points must therefore be capable of withstanding these stresses. In the conventional spoke connection arrangement, stresses due to the spoke tension are concentrated over a relatively small region of the hub flange, namely the portion of the hub flange material that is radially outward from the spoke hole. This requires that the hub flange construction be based on expensive, higher strength materials and the use of more expensive forming processes, such as forging, rather than less costly processes, such as die casting or injection molding. Further, these stresses require that the flange be designed with robust thickness, thus adding weight to the wheel assembly.

The spokes of most conventional wheels are constructed of steel wire with a sharp "J" bend close to the headed end and adjacent to the point where they pass through the hole in the flange. The "J" bend region of the spoke is considerably weaker and less ductile due to the overstress of the material to achieve this bend. As would be expected, the "J" bend region is a common breakage point for spokes of conventional design. Spoke manufacturers have attempted to compensate for this shortcoming by thickening the wire in this region, but this solution results in considerable extra expense and weight.

With conventional wheels, the spoke is simply passed through the flange hole until the head of the spoke contacts the edge of this hole. The result is a loose clearance fit between the hub flange and the spoke, which permits the spoke to squirm and shift inside this hole. This undesirable movement results in wear at the flange and additional flex at the rim and also causes the wheel to come out of alignment (true) rather easily.

Due to fabrication methods employed in conventional hub construction, it is very difficult to machine or otherwise create the details required to insure that the geometry of the hub flange conform to the spoke surface without any clearances. Such clearances allow flexure or movement under tensile loading of the spoke. Further, it is common practice for the builder of conventional wheels to manually bend the spokes in an attempt to conform the spoke to the hub flange and align the spoke in its direction toward the rim. This is obviously a compromise since, particularly in the case of bicycle wheels, the rim is of relatively light construction and any inconsistency in spoke tension or spoke flexure characteristics will cause the wheel to go out of true, or worse, will cause spoke breakage. When the tensile loads are not evenly shared by all of the spokes, the spokes with greater stresses will be more prone to breakage as will the portions of the rim and hub flange associated with these spokes.

In recent years, some attempt has been made to improve on this conventional wheel design, but the changes have been minor and still retain the same materials and basic configuration. Interestingly, many of these more modern designs are simply a rehash of inventions that are more than 80 years old. This is likely due to the fact that, aside from some more esoteric examples, these modern wheels rely on similar materials and construction techniques as those employed 80 years ago.

While there have been limited attempts to utilize fiber reinforced composite materials in the construction of the spoke, rim, and/or hub components, the processes involved in their manufacture are extremely labor-intensive, with many manual operations to lay up and bond the materials and components together. Further, since the construction involves thermoset molding and bonding techniques, which utilize extended curing and molding cycle times, multiple sets of molds and tools must be utilized in order to achieve reasonable production volumes. Thus, a high tooling expense is also required.

Accordingly, it is an objective of the present invention to overcome the forgoing disadvantages and provide an improved vehicle wheel with improved spoke attachment.

SUMMARY OF THE INVENTION

In accordance with the present invention, it has now been found that the forgoing objects and advantages may be readily obtained.

The present invention obtains many advantages. It is an advantage of the present invention is to reduce cost of the assembly through the ability to utilize inexpensive and efficient manufacturing techniques in the production of component parts.

The hub and hub flange of the present invention may be produced using "net shape" molding techniques that reduce or eliminate the need for expensive machining operations. Since this design is well suited to such molding or casting operations, the desired hub geometry may be produced with few, if any, secondary-machining operations. In the case where subsequent machining is required, far fewer of these costly operations are anticipated than if the hub were produced from a billet or a forging. Further, in such a "net shape" forming operation, the amount of material waste is greatly reduced, particularly when compared to a part that is fully machined from billet.

It is a further advantage to utilize lower cost materials. The present invention lends itself to the utilization of fiber-reinforced composite materials for the connecting element and/or spoke components. For example, the hub shell may be a molding produced from fiber-reinforced thermoplastic resin, which is a readily available and relatively economical material, as compared to forged aluminum, the conventional material of hub shells.

It is a still further advantage to produce a wheel that has lower manufacturing and assembly costs. The present invention lends itself to automated or semi-automated welding and bonding techniques that permit the spokes to be joined to the hub and/or rim with rapid assembly cycle times. This increased productivity also requires fewer molds and fixtures for lower tooling cost.

Further still, many embodiments of the present invention do not require that the spoke be threaded through holes in the respective connecting element (i.e. hub flange or rim), a labor-intensive process. Instead, the spoke(s) may be simply and quickly positioned in the desired location and then secured in place by welding or bonding. This reduces the amount of labor involved in the assembly.

In a further advantage, this assembly method of the present invention creates a robust and integral assembly without requiring large numbers of additional components and/or fasteners to create a robust connection. This reduces the parts count and overall assembly complexity and also reduces the overall parts cost of the assembly.

Further objects and advantages of my invention will become apparent from considering the drawings and ensuing description.

BRIEF DESCRIPTION OF THE DRAWINGS

The present invention will be readily understandable from a consideration of the accompanying drawings, wherein:

FIG. 2b is a cross-section view of the prior art bicycle wheel as seen generally in the direction 15-15 of FIG. 2a;

FIG. 4d is cross section view along 87-87 of the embodiment of FIG. 4a, showing the assembly in exploded view corresponding to the sequence of FIG. 4a;

FIG. 5a is an exploded perspective view of a third embodiment of the present invention, prior to joining, showing a duplex spoke with a knurled portion and a two-piece connector assembly without grooves;

FIG. 5b is a perspective view of the embodiment of FIG. 5a, showing the connector assembly integrally joined together, with the duplex spoke therebetween;

FIG. 5c is cross section view along 126-126 of the embodiment of FIG. 5b;

FIG. 5d is cross-section view along 128-128 of the embodiment of FIG. 5c, showing the assembly in exploded view corresponding to the sequence of FIG. 5a;

FIG. 5e is cross-section view along 128-128 of the embodiment of FIG. 5c;

FIG. 11a is an exploded perspective view of an eighth embodiment of the present invention, showing a spoke, a two-piece connector, and an intermediate element;

FIG. 11b is a perspective view of the embodiment of FIG. 11a, showing the intermediate element assembled with the integrally joined connector assembly, including the spoke;

FIG. 11c is a perspective view of the embodiment of FIG. 11b, showing the spoke assembled to the connector assembly, including spoke tension;

DETAILED DESCRIPTION OF THE INVENTION

Figure 1:
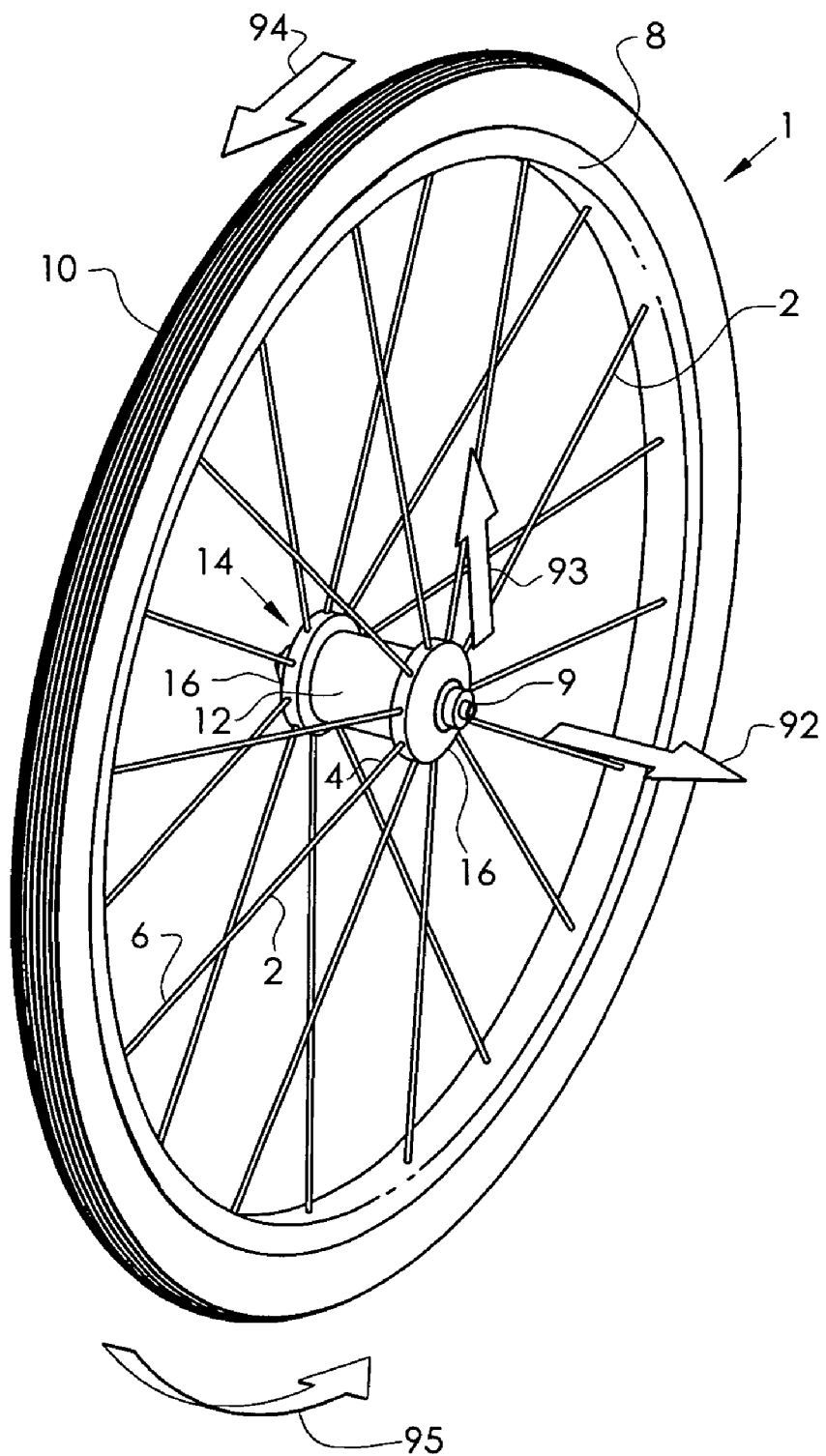
FIG. 1 is a perspective view schematically illustrating the general configuration of a prior art vehicle wheel as applied to a bicycle wheel.

The present invention comprises a vehicle wheel spoke (i.e. tensile element) having an end portion and a cross-section thereof, a bracing element, and a tensile axis of applied tensile load along the spoke. The spoke is connected to at least one bracing element by means of an engaged and/or captured connection between the spoke and a connecting element.

The connecting element consists of a first pre-formed portion and a second portion that is integrally joined to the first portion to capture and/or retain the spoke. These two (or more) portions of the connecting element may be separate discreet elements or they may be two portions of the same element. Further, this connecting element may be integral with the bracing element or it may constitute an intermediate element that is connected to the bracing element.

A spoke is a generally long slender tensile element, with a length greater than its cross sectional width, and with a longitudinal axis extending generally along its length. The spoke includes sidewall surface(s) that extend generally along its length. As such, the longitudinal axis is generally parallel to the sidewall surface. In most of the embodiments of the present invention, the spoke is capable of supporting tension, otherwise known as positive tensile loading, along its length. However, the spoke may alternatively support compression, otherwise known as negative tensile loading, along its length, where the spoke provides columnar support between two bracing elements. As such, it is understood that the spoke or tensile element provides a structural connection between two bracing elements. The tensile axis is the axis along which tensile loads are applied to the tensile element, and is commonly collinear with the longitudinal axis, especially in the region of the structural span of the spoke. However, if the spoke is bent or redirected, then the longitudinal axis will deviate from the tensile axis. For the purposes of explanation herein, the term "longitudinal axis" may often be interchangeable with the term "tensile axis", unless otherwise noted.

A bracing element is one that resists or braces against all or part of the tensile load of a tensile element. In other words, in order for a tensile element to maintain its tension (or compression) and remain a generally static structure, it must have a resisting or bracing element to bear against. Thus, the tensile element is generally anchored to two bracing elements and the tensile element thereby serves to connect the two bracing elements to each other. In an example where the tensile element is generally held in tension, such as the spoke of a tension-spoke vehicle wheel, a first bracing element could be the hub flange and a second bracing element could be the outer rim hoop. Similarly, in the case where the tensile element is generally held in compression, such as the spoke of a compression-spoke vehicle wheel, the bracing element (i.e. the hub or rim) is that element which the tensile element is pushed against.

In use, the spoke is engaged to the connecting element in a "tensile engagement" to prevent relative movement between the spoke and the connecting element along the spoke's longitudinal axis to resist spoke tensile forces. Further, the connecting element may also include geometry to at least partially wrap around the cross section of the spoke. In this way, the connecting element may also serve to provide a retained or "laterally captured" connection with the spoke to prevent excessive movement between the spoke and the connecting element in a direction perpendicular to the longitudinal axis. This laterally captured connection insures that the spoke maintains its engagement with the connecting element to resist spoke tensile forces. In other words, the connecting element serves to engage the spoke to resist tensile force and also serves to capture the spoke to maintain this engagement. For simplicity, it is preferable that this engagement function and this capturing function be achieved in a single connecting element. However, an alternative configuration may employ two connecting elements, with a first connecting element providing the tensile engagement and a second connecting element providing the lateral captured engagement of the same spoke.

The connecting element, or a portion thereof, may be integral with a bracing element to provide a direct connection between the spoke and the bracing element. Alternatively, the connecting element may be a separate element that is instead connected to the bracing element. Further, an auxiliary or intermediate element(s) may be incorporated into the design to facilitate the connection between the spoke and the bracing element.

In the discussions herein, the term "coupling" identifies a connecting element that serves to provide a structural connection between the two tensile elements, thus permitting tensile loads to be transmitted from one tensile element to another. The term "termination" or "anchor" identifies a connecting element that serves to provide a means to connect the tensile element (i.e. spoke), either directly or indirectly, to a bracing element (i.e. the hub or rim), to which the tensile element is intended to be anchored.

The tensile element or spoke has a sidewall surface(s) that are generally parallel to the longitudinal axis and an end face that is generally perpendicular to the sidewall surface. With a slender spoke, the sidewall tends to have far greater available surface area than its end face. It may be advantageous to provide a connection interface with a portion of this sidewall surface, since this provides a broad surface area of interface. Since a greater surface area tends to provide a more robust connection, it is often preferable to provide a longitudinal connection interface that extends longitudinally along the sidewall surface by a longitudinal distance at least twice the cross sectional thickness of the spoke. This is in contrast to the conventional arrangement that focuses these loads on a small point of contact as with conventional prior art wheel assemblies.

FIG. 1 describes the basic configuration of an exemplary vehicle wheel, in particular, a bicycle wheel 1, as well as a description of the direction conventions used throughout this disclosure. The hub shell 14 is rotatable about the axle 9 and includes at least two axially spaced hub flanges 16, each of which include a means for connecting with the spokes 2. The hub flange 16 may be contiguous with the hub shell 14 or it may be separately formed and assembled to the hub body 12 portion of the hub shell 14. The spokes 2 are affixed to the hub flange 16 at their first end 4 and extend to attach the rim 8 at their second end 6. The tire 10 is fitted to the outer periphery of the rim 8. The axial direction 92 is any direction parallel with the axis of the axle 9. The radial direction 93 is a direction generally perpendicular to the axial direction 92 and extending generally from the centerline of the axle 9 radially outwardly toward the rim 8. The tangential direction 94 is a direction generally tangent to the rim at a given radius. The circumferential direction 95 is a cylindrical vector that wraps around the axial direction 92 axis at a given radius. The wheel of FIG. 1 is generic and may be of tension-spoke or compression-spoke design. A radial plane is a plane defined by an axial vector and a radial vector. An axial plane is defined by two radial vectors at a given axial intercept.

While it is most common for the hub shell 14 to rotate about a fixed axle 9, there are some cases where it is desirable to permit the axle 9 to be fixed with the wheel 1 such as the case where the wheel 1 is driven by the axle 9.

For the purposes of using conventional terminology, the term "hub flange" is used herein to describe a region of the hub shell 14 to which the spokes 2 are joined. While the surface of the hub flange may be raised and flange-like in comparison to other surfaces of the hub shell 14, this is not a requirement for the present invention and the hub flange 16 may alternatively be flush or recessed relative to other hub shell surfaces.

It may be easiest to mold or otherwise form or fabricate the individual hub flanges 16 separately and then assemble these hub flanges 16, along with other components as required, such as the body portion 12, to create a complete hub shell 14. This hub shell 14 assembly may be permanent or else it may be removably assembled, allowing the hub flange 16 to be disassembled from the other portions of the hub shell 14 for servicing in the field. However, it is also anticipated that the hub shell 14, including the body portion 12 and a multiple of hub flanges 16, may be molded or formed together as a unit.

As is well known in the art, a wheel 1 may be of tension-spoke construction, where the central hub hangs in tension by the spokes from the rim portion directly above, or it may be of compression-spoke construction, where the hub is supported by compressing the spoke directly beneath it. Since the present invention may be directed toward bicycle wheels and since the tension-spoke wheel is generally a more efficient structure than compression-spoke wheel, most of the discussion herein is focused with an eye toward tension-spoke wheel construction. However, it is anticipated that most, if not all, of the embodiments of the present invention may be applied to compression-spoke wheel construction as well. For a tension-spoke wheel, it is preferable that the wheel includes at least two hub flanges that are axially spaced on either side of the rim or, more specifically, the spoke attachment points at the rim. Thus the spokes fixed to opposite hub flanges will converge as they extend to the rim as illustrated in FIG. 2b. Additionally, a tension-spoke wheel will usually be pretensioned during assembly to create a pretensioned structure of balanced spoke tension that allows the axle loads to be distributed among several, if not all, of the spokes of the wheel. It is this ability to share the stresses among its spokes that helps to make the tension-spoke wheel the highly efficient structure that it is. For a compression-spoke wheel, it is often preferable to employ at least two axially spaced hub flanges, however, in the case where the spokes have sufficient bending stiffness to support the requisite lateral loads, only a single hub flange may be employed.

Figure 2A:
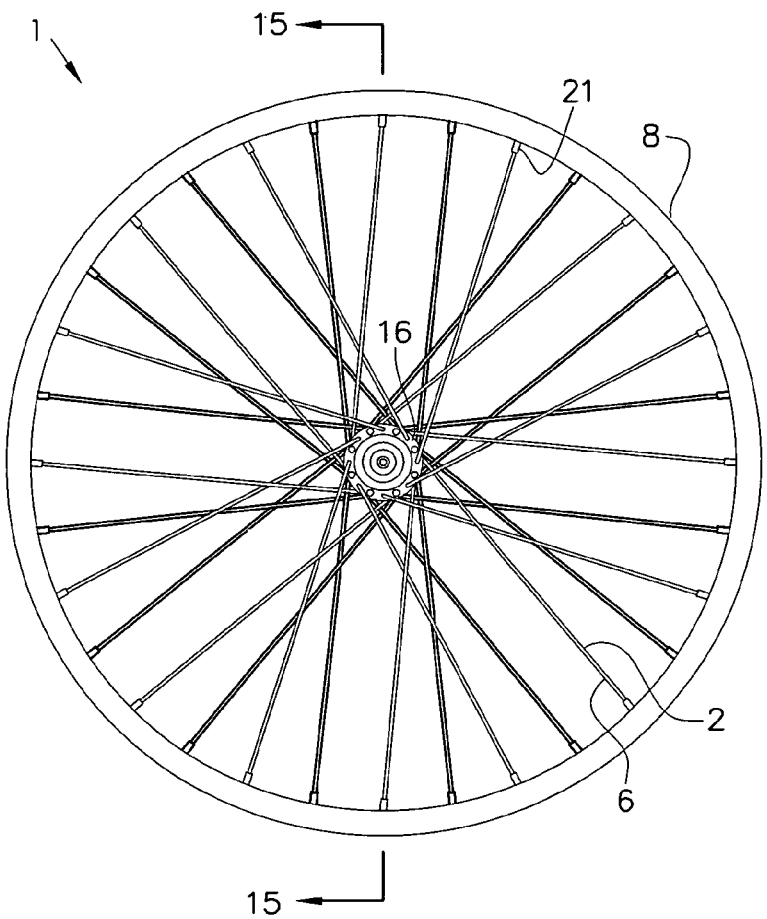
FIG. 2a is an axial plan view illustrating a prior art bicycle wheel.
Figure 2B:
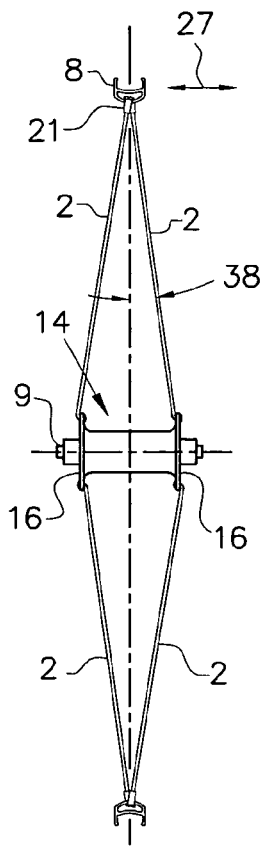
Figure 2C:
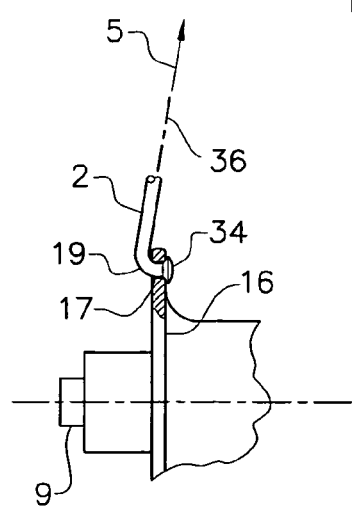
FIG. 2c is a fragmentary view detailing the view illustrated in FIG. 2b where the hub flange is shown in a partial cross-section to illustrate the connection with the spoke.

FIGS. 2a, 2b and 2c describe the current technology in conventional bicycle wheels that most cyclists are familiar with. This prior art design includes a rim 8, a hub shell 14 and a plurality of spokes 2. The hub shell 14 is rotatable about the axle 9 and includes a pair of axially spaced hub flanges 16. The wheel 1 is assembled by first threading each individual spoke 2 through an axial hole 17 in the hub flange 16 until the j-bend 19 is hooked within the hole 17. The spoke 2 is then pivoted to extend in a generally radial direction toward the rim 8. The enlarged portion 34 or "head" of the spoke 2 prevents the spoke 2 from pulling through the hole 17 in the hub flange 16 due to spoke tension force 5. The second end 6 of each spoke 2 is then fixed to the rim 8 via spoke nipples 21. Tightening the threaded engagement between the spoke nipple 21 and the spoke 2 serves to effectively shorten the length of the spoke 2. Thus, as the nipples 21 are threadably tightened, the spokes are drawn up tight and a degree of spoke tension force 5 is induced in the spoke 2. By selectively adjusting this threaded engagement, the spoke tension force 5 may be adjusted to align the trueness of the rim 8. The spoke tension force 5 is resisted by circumferential compression of the rim 8 and it is this balance of forces that imparts efficient structural integrity to the bicycle wheel 1. Also shown in FIG. 2b is bracing angle 38 between the radial centerline plane of the rim 8 and the tensile axis 36 of the spokes 2. As this bracing angle 38 is increased, the lateral stiffness (i.e. stiffness in the axial direction) of the wheel 1 is also increased.

Figure 3A:
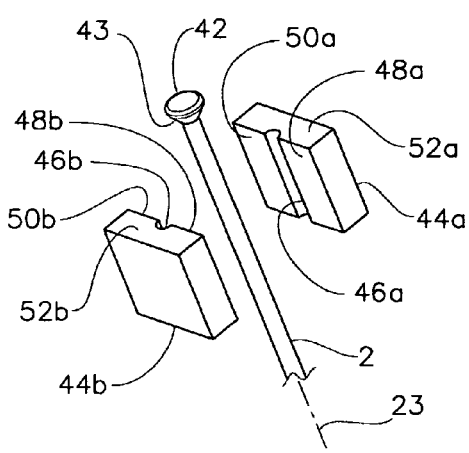
FIG. 3a is an exploded perspective view of a first embodiment of the present invention, showing a spoke and a two-piece connector assembly.
Figure 3B:
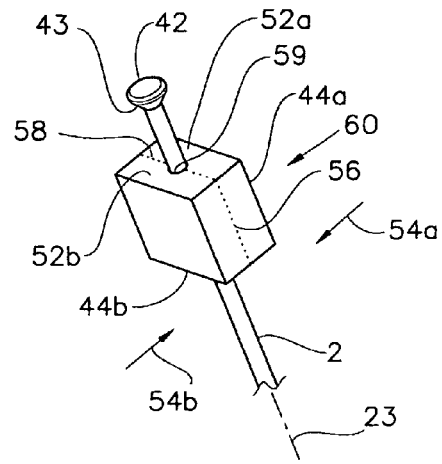
FIG. 3b is a perspective view of the embodiment of FIG. 3a, showing the spoke loosely assembled to the integrally joined connector assembly.

The embodiment of FIGS. 3a-d shows a connecting element composed of two pre-formed connectors assembled together as shown. Connector 44a includes groove 46a, face 52a and joining surfaces 48a and 50a. Similarly, connector 44b includes groove 46b, face 52b and joining surfaces 48b and 50b. Spoke 2 includes longitudinal axis 23 and a head or enlarged portion 42, with an outwardly flaring transition portion 43 between the diameter of the spoke 2 and the diameter of the enlarged portion 42. FIG. 3a shows the spoke 2 and connectors 44a and 44b positioned prior to their assembly, with the spoke 2 aligned with grooves 46a and 46b. FIG. 3b shows connectors 44a and 44b assembled together in assembly directions 54a and 54b respectively such that spoke 2 is located within grooves 46a and 46b. The connectors 44a and 44b are then integrally joined together at joining interface 56, where joining surfaces 48a and 48b meet, and at joining interface 58, where joining surfaces 50a and 50b meet. The integral joinder of connectors 44a and 44b creates the connector assembly 60, which serves to capture and surround the cross section of the spoke 2. Thus the connector assembly 60 completely surrounds the cross section of the spoke 2, with the spoke laterally captured therein. It should be noted that, in this embodiment, joining interfaces 56 and 58 extend generally in a direction perpendicular to the assembly directions 54a and 54b and parallel to the longitudinal axis 23.

This integral joinder may be achieved by a variety of means, including welding, adhesive bonding, soldering, etc. For example, if connectors 44a and 44b are made of a weldable metallic material, they may be welded together by resistance welding at joining interfaces 56 and 58. Similarly, if connectors 44a and 44b are made of a weldable polymeric material, they may be welded together by ultrasonic welding at joining interfaces 56 and 58. Of course, a wide range of alternate welding methods may be employed. In an alternate exemplary arrangement, adhesive may first be applied to surfaces 50a, 50b, 48a, and 48b such that, upon assembly, connectors 44a and 44b are adhesively joined together at joining interfaces 56 and 58. Surface joining techniques such as welding and adhesive bonding are often preferable, since the entirety of joining surfaces 48a, 48b, 50a, and 50b may be integrally joined at their respective joining interfaces 56 and 58 to create an exceptionally robust joinder. While it is envisioned that the spoke 2 may be integrally joined to the connector assembly 60 as well, FIGS. 3a-e show the spoke as merely retained and/or captured by the connector assembly 60. It is noted that connectors 44a and 44b are pre-formed elements prior to their integral joinder, although these connectors may deform somewhat when they are joined together around the spoke.

Figure 3C:
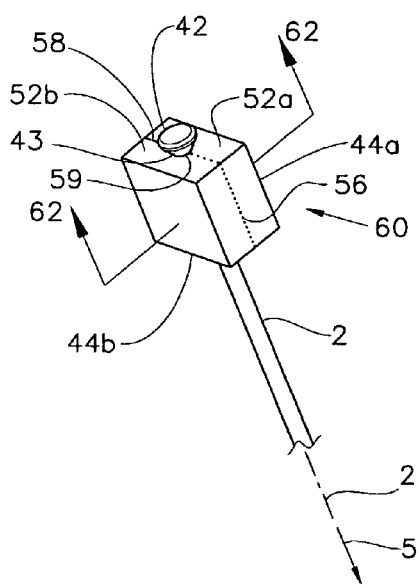
FIG. 3c is a perspective view of the embodiment of FIG. 3b, showing the spoke assembled to the connector assembly, including spoke tension applied to the spoke.
Figure 3D:
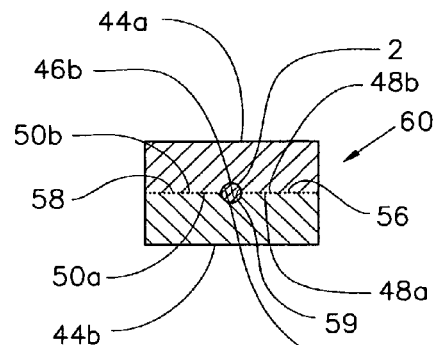
FIG. 3d is cross section view along 62-62 of the embodiment of FIG. 3c.

FIG. 3c shows the connector assembly 60 of FIG. 3b with spoke tension force 5 applied to the spoke 2, drawing the spoke 2 through the hole 59 created by grooves 46a and 46b such that the transition portion 43 bears against surfaces 52a and 52b. An overlie engagement between the spoke 2 and the connector assembly 60 is achieved such that the spoke 2 is firmly anchored to the connector assembly 60, resulting in a tensile engagement therebetween to resist spoke tension force 5. Further, the spoke 2 is laterally retained or captured with the connector assembly 60 by the hole 59. FIG. 3d shows the assembly of FIG. 3c along section line 62-62. The hole 59 is designed to have requisite clearance with the cross section of the spoke 2 such that the spoke 2 may be slid longitudinally, relative to the connector assembly 60 as shown here. However, it is also envisioned that the geometry of the connector assembly 60 and the spoke 2 may be alternatively designed without such clearance, moreover it may be designed such that there is an interference fit therebetween, such that the hole 59 impinges on the spoke 2 to grip and/or squeeze the spoke 2.

Figure 3E:
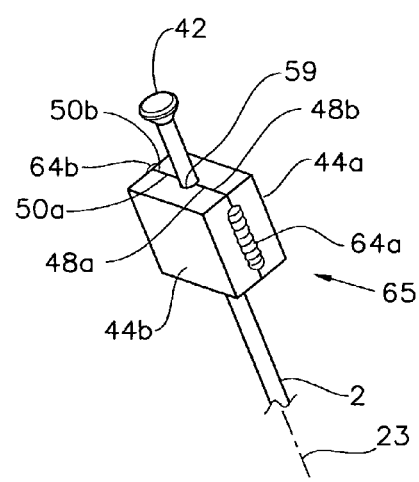
FIG. 3e is a perspective view of the embodiment of FIG. 3b, showing an alternate joinder of the connector, including a weld bead.

FIG. 3e corresponds to FIG. 3b and shows an alternate joining arrangement between connectors 44a and 44b. In this figure, connector 44a is welded to connector 44b to create connector assembly 65 via weld beads 64a and 64b in a region external to joining interfaces 56 and 58. Weld beads 64a and 64b may simply be formed by fusing and welding the parent material of the connectors 44a and 44b or else additional filler material may be added during the welding process. Both are common welding processes for both metallic and polymeric materials. Thus, weld beads 64a and 64b may be positioned adjacent joining surfaces 48a, 48b, 50a, and 50b to provide an integrated structural bridge between connectors 44a and 44b. While FIG. 3e shows joining surfaces 48a and 50a contacting opposed joining surfaces 48b and 50b, it is also envisioned that a gap may exist between joining surfaces 48a and 50a and/or joining surfaces 48b and 50b, with weld beads 64a and/or 64b providing a structural bridge across this gap.

It should be understood that the embodiment of FIGS. 3a-d is a generic schematic representation of a connector assembly 60 that provides a laterally captured tensile engagement of the spoke 2. This connector assembly 60 may be adapted to a wide range of designs. For example, one or both of the connectors 44a and 44b may be integral with, or otherwise connected to, a bracing element, such as the hub and/or rim of a vehicle wheel. Alternatively, the connector assembly 60 may serve as an intermediate connecting element that is assembled or connected to a bracing element.

The outer surface of the spoke 2 is shown here to be generally smooth and consistent in the region where it interfaces with the grooves 46a and 46b. Similarly, grooves 46a and 46b are shown here to be generally smooth and consistent in the region where they interface with the spoke 2. Alternatively, the spoke 2 and/or the grooves 46a and/or 46b may have configured geometry with raised regions designed to emboss or impinge on the other during assembly.

In this embodiment, a wide range of materials may be utilized to form the connector assembly 60 and spoke 2. For example, the spoke 2 may be made of metallic material, such as stainless steel, or it may be made of fiber-reinforced polymer resin, preferably with long fibers extending the length of the spoke. The spoke may alternatively be made of a yarn of "dry" fiber without a matrix resin. Alternatively, the spoke may be made of another material of sufficient structural strength and stiffness for proper function. Still further, the spoke may be made of a combination of materials. The connectors 44a and 44b may likewise be made of metallic material, or may be made of polymeric material, preferably with fiber reinforcement. Alternatively, the connectors may be made of another material, or combination of materials, of sufficient structural strength and stiffness for proper function. In a preferred arrangement, the connectors 44a and 44b are made of fiber reinforced polymeric material, such as glass-reinforced polyamide, and the spoke 2 is made of stainless steel, which is commonly used in spoke manufacture. Connectors 44a and 44b may be integrally joined at joining interfaces 56 and 58 via ultrasonic welding, a well known process that may provide a firm joinder and is also an economical process with high productivity.

In a welded connection, the adjoining materials of the two welded components are softened or liquefied to flow and become fused together to form an integral unit. As a general rule, a welded connection is an integral joinder and may not be disassembled at the service temperature without damaging at least one of the components. In an adhesively bonded connection, the adjoining materials of the two components are integrally joined by means of adhesion where one surface is adhered to another. Often an adhesive is introduced between the two components to be joined, where the adhesive serves to adhere to both components, thereby serving as the link to integrally join the two components together.

In a preferred embodiment, each of the two components to be welded includes a thermoplastic polymeric material on at least a portion of its surface. The welded connection comprises the welding of the thermoplastic polymeric surface of a first component with the thermoplastic polymeric surface of the second component. One well-known process for achieving such thermoplastic welding is referred to as ultrasonic welding whereby ultrasonic energy creates high-frequency mechanical vibration that, in turn, imparts heat to the joint to be welded. Ultrasonic welding is especially suited to melt thermoplastic polymers, although the process has also been applied to metals as well. Other welding techniques such as spin welding and vibration welding, among others, are viable processes that also rely on mechanical energy to produce localized melting and joining. While the application of mechanical energy is particularly suited to provide the localized melting and welding required for assembly as described, it is also anticipated that the thermoplastic polymer material may be melted through the direct application of heat or energy from a focused source such as a laser or electron beam. Other thermal energy welding methods may include thermal conduction, such as hot-plate welding or infra-red energy transfer.

While it is most often preferable to weld two components directly to each other, it is also envisioned that a filler material may be utilized to facilitate welding. In such a case, a filler material, is located within the welded joint such that each component is welded to the filler material and thus the two components are thereby welded to each other. One such example is to utilize a filler material that includes metallic particles. When this material is placed within a strong magnetic field, the metallic particles temporarily become heated to soften or liquefy the filler material and/or the mating components, thereby welding to two components to each other. Such a process is commonly referred to as induction welding.

With several of these welding processes, welding is achieved through the combination of heating and pressure. This heating serves to temporarily soften and/or liquefy the two components at the interface where they meet, thereby permitting the material of the two components to flow and become fused together. The joining pressure is applied to the components in order to force the two into intimate contact during the welding process. This joining pressure may be applied in the assembly direction or in a direction generally perpendicular to the longitudinal axis or a direction generally parallel to the longitudinal axis or in some combination of these directions. While this joining pressure is involved with most of the preferred welding processes described herein, welding may alternatively be achieved without pressure. In such a case, the heated materials of the two components are simply allowed to slump together through gravity and/or surface tension, such that the components are thereby fused. Some welding techniques do not require joining pressure, but merely require that the parts to be welded be positioned correctly during the welding process.

In general, an integral joinder is one that is integrated and may not be easily disassembled at the service temperature without damaging at least one of the components that are joined. This integral joinder involves a joining interface directly between two components. Preferably this joining interface is a surface interface, rather than a point interface. The integral joinder is in contrast to a fastened joinder, where such a fastened joinder relies solely on a mechanically interlocked engagement to secure or connect the two components to each other. The integral joinder is advantageous and is usually an exceptionally strong and robust joinder. It is also usually an uncomplicated joinder that generally requires only a minimum of additional materials to join the two components. Further, the integral joinder may often be produced economically in a fast, high-productivity operation, such as spot welding or ultrasonic welding.

In an alternative assembly process, the connectors 44a and 44b may be adhesively bonded together at joining interfaces 56 and 58. In such a case, the preferred method is to coat joining surfaces 48a, 50a, 48b and/or 50b with adhesive such that, when connectors 44a and 44b are assembled as described, these joining surfaces are pressed against each other with the adhesive sandwiched in between. Once the adhesive cures and/or solidifies, a firm and robust connection is created between connectors 44a and 44b. As a general rule, an adhesively bonded connection is an integral joinder and may not be easily disassembled at the service temperature without damaging at least one of the components, such as connectors 44a and 44b. As noted, there are a wide range of further alternate integral joining methods, including soldering, etc.

FIGS. 4a-e describe an embodiment similar to that described in FIGS. 3a-e. However, the embodiment of FIGS. 4a-e utilize a longitudinal engagement between the connector assembly and the spoke instead of a single overlie engagement. Connector 66a includes groove 72a, and joining surfaces 68a and 70a. Similarly, connector 66b includes groove 72b, and joining surfaces 68b and 70b. Spoke 71 includes a configured or knurled portion 74, with a series of raised edges and relieved pockets therebetween that are spaced along the longitudinal axis 23 of the spoke 71. Grooves 72a and 72b include configured or knurled surfaces that are matched to mate and nest with knurled portion 74. Thus grooves 72a and 72b include a series of raised ridges 88a and 88b that are intended to correspond and mate with the relieved grooves 91 of knurled portion 74 and vice versa.

Figure 4A:
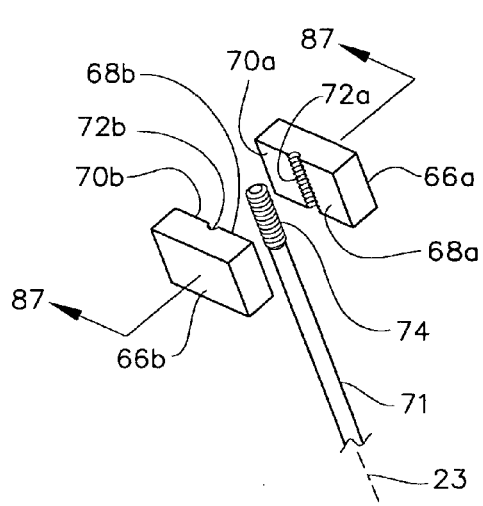
FIG. 4a is an exploded perspective view of a second embodiment of the present invention, prior to joining, showing a spoke with a knurled portion and a two-piece connector assembly with mating knurled grooves.
Figure 4B:
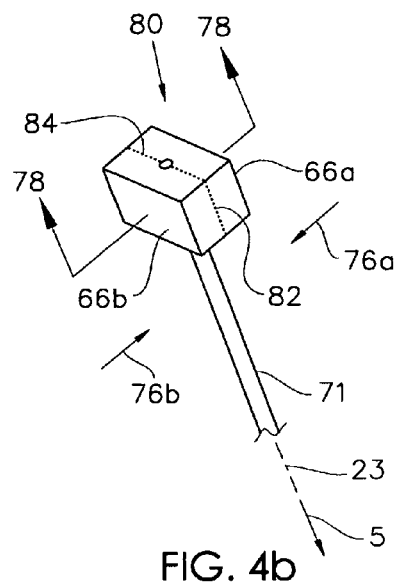
FIG. 4b is a perspective view of the embodiment of FIG. 4a, showing the integrally joined connector assembly, with the spoke located therebetween.

FIG. 4a shows the spoke 71 and connectors 66a and 66b prior to their assembly, with the knurled portion 74 of spoke 71 positioned between grooves 72a and 72b. FIG. 4b shows connectors 66a and 66b assembled together in assembly directions 76a and 76b respectively such that knurled portion 74 of spoke 71 is located within grooves 72a and 72b. Joining surface 68a is now contacting joining surface 68b at the joining interface 82 where these surfaces meet. Likewise, joining surface 70a is now contacting joining surface 70b at joining interface 84. This is shown in greater detail in FIG. 4d, where groove 72a includes a series of raised ridges 88a interspersed with a corresponding series of relieved pockets 89a. Similarly, groove 72b includes a series of raised ridges 88b interspersed with a corresponding series of relieved pockets 89b. Likewise, knurled portion 74 includes a series of raised ridges 90 interspersed with a corresponding series of relieved grooves 91 that extend in a direction generally perpendicular to the longitudinal axis 23.

As shown in FIG. 4b, connectors 66a and 66b are brought together in assembly directions 76a and 76b such that joining surfaces 68a, 68b, 70a and 70b are joined together at joining interfaces 82 and 84. Connector assembly 80 is thus created to capture and surround the cross section of the spoke 71. Again, this joinder may be achieved by a variety of means to create an integral joinder, as mentioned previously, including welding, soldering, adhesive bonding, or any other integral joining means at, or adjacent to, joining interfaces 82 and 84. Thus connectors 66a and 66b are joined together to create connector assembly 80. It should be noted that, in this embodiment, joining interfaces 82 and 84 extend generally in a direction perpendicular to the assembly directions 76a and 76b and parallel to the longitudinal axis 23.

Figure 4C:
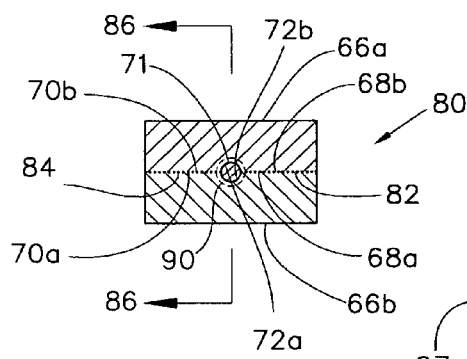
FIG. 4c is cross section view along 78-78 of the embodiment of FIG. 4b.
Figure 4D:
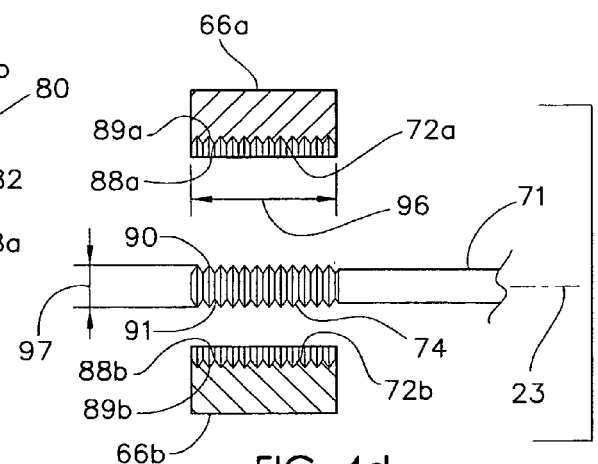
Figure 4E:
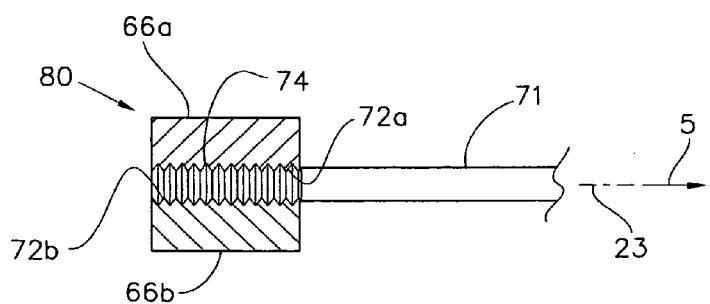
FIG. 4e is cross section view along 86-86 of the embodiment of FIG. 4c.

The contours of knurled portion 74 are now matched and nested with the corresponding contours of grooves 72a and 72b. Raised ridges 88a and 88b are nested in relieved grooves 91 and raised ridges 90 are nested in relieved pockets 89a and 89b. A series of longitudinally spaced interlocking overlie engagements are thereby created between knurled portion 74 and grooves 72a and 72b, thus firmly anchoring the spoke to the connector assembly 80 to resist spoke tension force 5. FIGS. 4c-e are cross sectional views that describe the joined assembly of FIG. 4b in greater detail. FIG. 4e shows in detail how the raised ridges 88a and 88b are nested in relieved pockets 91 and raised ridges 90 are nested in relieved pockets 89a and 89b such that the spoke 71 is laterally captured, y and has a tensile engagement with the connector assembly 80.

It is noted that the spoke 71 has a cross sectional thickness 97 and an engagement length 96 along the longitudinal axis 23 as shown in FIG. 4d. It is noted that the engagement length 96, as shown in this embodiment, is approximately 3 times larger than the cross sectional thickness 97. The embodiment of FIGS. 4a-c describes what may be termed a longitudinal engagement that acts along the longitudinal axis 23 of the spoke 71. This longitudinal engagement distributes the spoke tension loads and the associated stresses over a longitudinal length, rather than focusing these loads at a small point of contact, as with conventional prior art wheel assemblies. It may be termed that a longitudinal engagement includes a continuous engagement interface, or at least two engagement interface locations, that are longitudinally spaced along the longitudinal axis 23 of the spoke 71. It is generally desirable that the longitudinal length of such an engagement be greater than the cross-sectional thickness of the spoke to create an effective engagement. Obviously, increasing the length of engagement and/or the number of longitudinally spaced engagement interface locations will increase the tensile load carrying capacity of the connection.

Since a longitudinal engagement may reduce the contact stresses at the interface where the bracing element and the spoke are connected, this type of engagement is particularly applicable to connecting elements and/or spokes of polymer or reinforced polymer materials. This is particularly advantageous, since these materials tend to have high strength and light weight. However, heretofore these materials have been difficult to apply to conventional spoke connection systems that are generally focused on construction based on metallic materials.

In order to take advantage of the lightweight and high strength of the high-performance fibers mentioned hereinabove, it may be preferable to incorporate these material(s) in the spoke. These materials tend to be anisotropic and have greater strength along the direction of the fiber. Thus it is preferable that these fibers are aligned to be parallel to the tensile axis. It may also preferable that these reinforcement fibers be encapsulated in a matrix. While short or discontinuous fibers often provide significant reinforcement to the matrix material, it is preferable that the fibers be as long as possible to provide the greatest overlap with adjacent fibers. The utilization of continuous fibers that extend generally along the length of the spoke provides the highest mechanical properties. It is further preferable that the fibers extend along the tensile axis to overlap within the region of the clamped interface.

FIGS. 5a-e describe an embodiment similar to the embodiment of FIGS. 4a-d, however the spoke of FIGS. 5a-d is a duplex spoke 98, which incorporates two structural spans 100a and 100b, with a common portion 102 therebetween. Each span 100a and 100b extends between two bracing elements. The common portion 102 includes a configured or knurled portion 105, with a series of raised ridges 112 and relieved grooves 113 therebetween as shown in FIG. 5d. In a further distinction over the embodiment of FIGS. 3a-e, connectors 104a and 104b do not include grooves or recesses to receive the spoke. Instead, these connectors are deformed around the spoke 98 during assembly.

FIG. 5a shows the connectors 104a and 104b prior to their assembly with the spoke 98. Connectors 104a and 104b include surfaces 106a and 106b and faces 103a and 103b respectively. It should also be noted that surfaces 106a and 106b are generally flat surfaces and do not include the grooves 46a, 46b, 72a, 72b that are described in FIGS. 3a-e and FIG. 4a-d.

FIG. 5b shows the connectors 104a and 104b assembled to the spoke 98 at the common portion 102. Connectors 104a and 104b are pressed against the spoke 98 in assembly directions 108a and 108b respectively such that surfaces 106a and 106b are embossed or otherwise deformed to conform to the spoke 98, including knurled portion 105. Simultaneously, surfaces 106a and 106b are welded or otherwise joined to each other at joining interfaces 110a and 110b that straddle the spoke 98, resulting in an integral joinder therebetween as similarly described in FIGS. 3a-d. It should be noted that, in this embodiment, joining interfaces 110a and 110b extend generally in a direction perpendicular to the assembly directions 108a and 108b and parallel to the longitudinal axis 23. Thus, a connector assembly 111 is created, which surrounds the cross section of the spoke 98. In an exemplary arrangement, the spoke 98 is made of stainless steel and the connectors 104a and 104b are made of thermoplastic polymeric material. With connector 104b supported in a nest, an energized ultrasonic welding horn (not shown) may be utilized to press against surface 103a, driving the connectors 104a and 104b toward each other in assembly directions 108a and 108b. As the surfaces 106a and 106b are pressed together and contact the spoke 98, the ultrasonic energy from the horn causes the connectors 104a and 104b to soften at the contact point, allowing them to plastically deform and conform to the surface of the spoke 98 and the knurled portion 105. As the connectors 104a and 104b are further pressed together, such that surfaces 106a and 106b contact each other, these surfaces melt and fuse to become welded to each other at joining interfaces 110a and 110b after the assembly cools. It should be noted that the polymeric connectors 104a and 104b generally do not weld to the stainless steel spoke 98 as these materials are generally incompatible for welding.

Further, with surfaces 106a and 106b now conformed to the knurled portion 105 of the spoke 98, the connectors 104a and 104b are now matched and nested with the corresponding contours of knurled portion 105, including the raised ridges 112 and relieved grooves 113. A series of longitudinally spaced interlocking overlie engagements are thereby created between knurled portion 105 and connectors 104a and 104b as shown in FIG. 5e and as previously described in FIGS. 4a-e. Thus, connector assembly 111 is created from the integral joinder of connectors 104a and 104b, firmly anchoring the spoke to resist spoke tension force 5 or, in the case of a duplex spoke 98, the difference between spoke tension forces 5 and 5'. FIGS. 5c and 5e are cross sectional views that describe the joined assembly of FIG. 5b in greater detail. Again, this joinder may be achieved by a variety of means to create an integral joinder, as mentioned previously, including welding, soldering, adhesive bonding, or any other integral joining means at, or adjacent to, joining interfaces 110a and 110b.

It should be noted that the arrangement shown in FIGS. 5a-d is a generally schematic design, which is intended to provide simple illustration of the concepts involved. Like all of the embodiments described herein, there exists a wide range of form to which these embodiments may be adapted. For example, the connectors 104a and/or 104b may be incorporated within a hub flange (not shown), with the common portion 102 captured therein. A first span 100a may now extend to one point of the outer rim (not shown), with a second span 100b extending to another point in the outer rim.

It should be understood that, the surface of the knurled portion 105 constitutes a series of raised ribs interspersed with correspondingly relieved portions therebetween along the longitudinal axis 23 of the spoke 98. As these raised ribs are pressed against surfaces 106a and 106b, they impart localized regions of high contact stress on these surfaces. This contact stress causes the surfaces 106a and 106b to yield and become deformed or embossed to conform to the knurled portion 105. This contact stress may be within the elastic range of the material of the connectors 104a and 104b, in which case, the associated deformation constitutes elastic deformation. Otherwise, this contact stress may be above the elastic range of the material of the connectors 104a and 104b, in which case, the associated deformation constitutes plastic deformation. In some arrangements, the embossing deformation may be a combination of both plastic and elastic deformation. The elastic portion of the deformation will serve to maintain spring back of the material and insure that the connection remains tight and without free-play or looseness. Since this embodiment shows a joinder that is embossed to include a series of longitudinally spaced engagement points associated with knurled portion 105, it may be considered a longitudinal engagement. It is noted that connectors 104a and 104b are both pre-formed elements prior to their integral joinder, although these components are shown to deform somewhat when they are joined together around the spoke.

While connectors 104a and 104b are shown here to have relatively smooth surfaces 106a and 106b, without any groove or indent prior to assembly, alternatively shallow grooves may be incorporated on these surfaces. While less than the full depth, as previously described in FIGS. 3a-e, these grooves may help to provide a defined location for alignment of the spoke 98 during assembly. Further, these grooves may provide a surface that partially wraps around the surface of the spoke 98 to require less deformation and to facilitate more closely matched joining interfaces 110a and 110b.

Figure 6A:
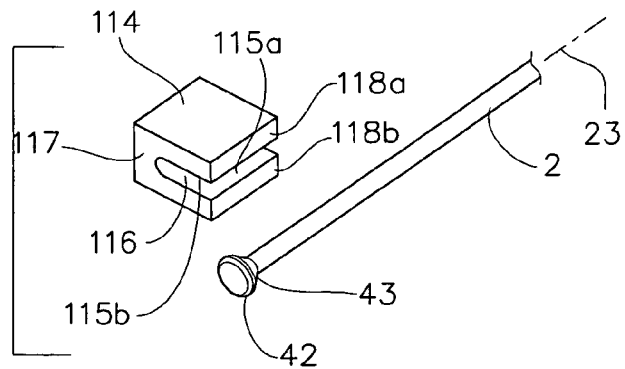
FIG. 6a is an exploded perspective view of a fourth embodiment of the present invention, prior to joining, showing a spoke and a one-piece connector.
Figure 6B:
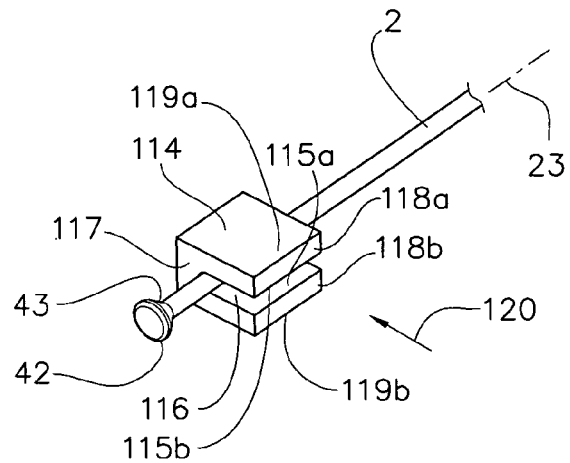
FIG. 6b is a perspective view of the embodiment of FIG. 6a, showing the spoke pre-assembled to the connector.

FIGS. 6a-d describes an embodiment with similarities to several of the previous embodiments. However, while the previous embodiments describe a multi-piece connector assembly, FIGS. 6a-d utilizes what may be termed a one-piece connector with two portions thereof. Connector 114 includes surface 117 and two integral tabs 118a and 118b, with slot 116 therebetween. Tab 118a includes outboard surface 119a and inboard surface 115a. Likewise, Tab 118b includes outboard surface 119b and inboard surface 115b. Spoke 2 includes a head or enlarged portion 42, with an outwardly flaring transition portion 43 between the diameter of the spoke 2 and the diameter of the enlarged portion 42. FIG. 6a shows the connector 114 and spoke 2 prior to assembly. Next, the spoke 2 is pre-assembled to the slot 116 in direction 120, as shown in FIG. 6b.

Next, outboard surfaces 119a and 119b are then pressed in respective assembly directions 122a and 122b such that tabs 118a and 118b deform and/or deflect to wrap around the spoke 2 such that inboard surfaces 115a and 115b contact each other and are joined to each other at a joining interface 124. Thus, the connector 114 now is wrapped to capture and surround the cross section of the spoke 2. As previously described in FIGS. 3a-e, surfaces 115a and 115b may be joined by a variety of means, including welding and adhesive bonding as also described herein to create an integral joinder therebetween. It should be noted that, in this embodiment, joining interface 124 extends generally in a direction perpendicular to the assembly directions 122a and 122b and parallel to the longitudinal axis 23. It should be noted that the embodiment of FIGS. 6a-d demonstrates how the connector 114 may be a pre-formed element that is then deformed to create the integral joinder and/or to engage the spoke 2.

Figure 6C:
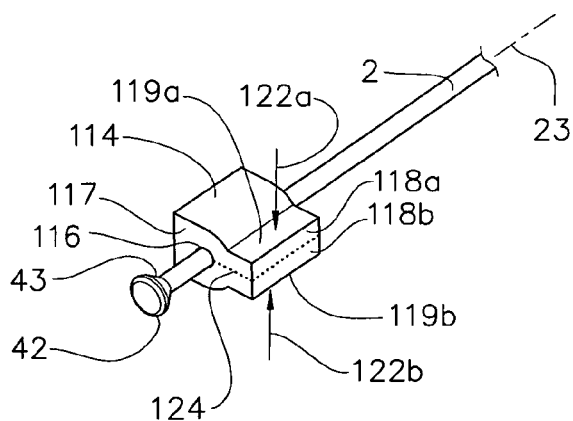
FIG. 6c is a perspective view of the embodiment of FIG. 6b, showing the spoke loosely assembled to the connector, with two portions of the connector integrally joined.
Figure 6D:
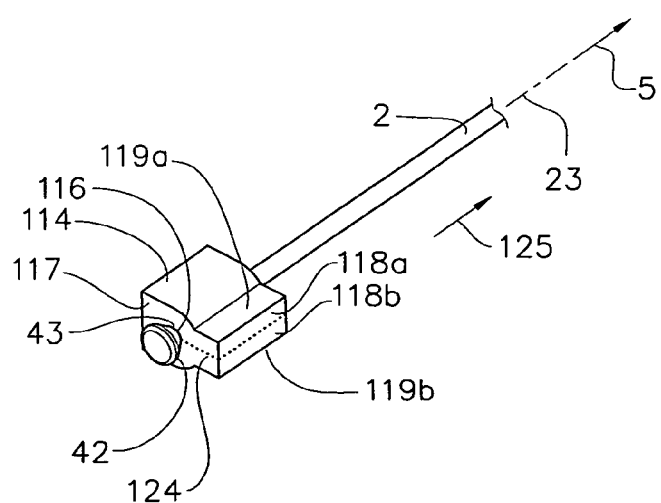
FIG. 6d is a perspective view of the embodiment of FIG. 6c, showing the spoke assembled to the connector, including spoke tension.

FIG. 6d shows the assembly of FIG. 6c with spoke tension force 5 applied to the spoke 2, drawing the spoke 2 in direction 125 to pass through the slot 116 such that the transition portion 43 bears against surface 117. An overlie engagement between the spoke 2 and the connector 114 is achieved such that the spoke is firmly anchored to the connector 114 to resist spoke tension force 5. It should be noted that the integral joinder between tabs 118a and 118b results in the condition that the spoke 2 is laterally captured by and has a tensile engagement with the connector 114.

Figure 7:
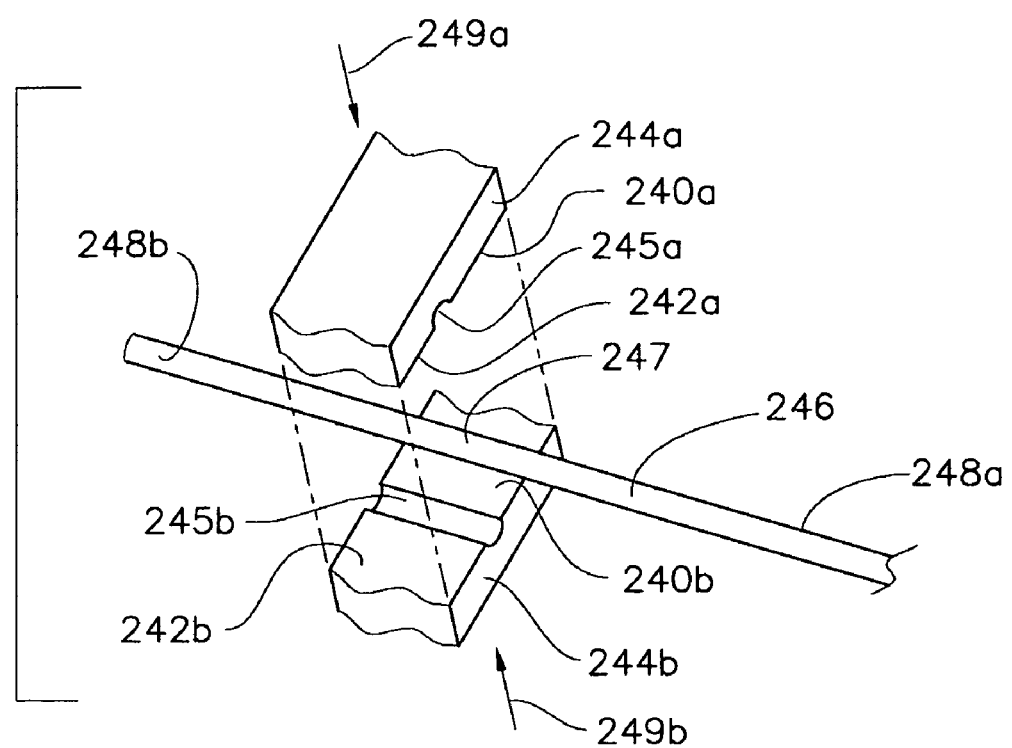
FIG. 7 is an exploded perspective view of a fifth embodiment of the present invention, showing a duplex spoke and connector.

FIG. 7 describes an embodiment that is in most respects similar to the embodiment of FIGS. 3a-e, and corresponds most directly to FIG. 3a. The embodiment of FIG. 7 shows a connecting element composed of two connectors 244a and 244b assembled together as shown. Connector 244a includes groove 245a, and joining surfaces 240a and 242a. Similarly, connector 244b includes groove 245b, and joining surfaces 240b and 242b. Spoke 246 is a duplex spoke and includes a common portion 247 that corresponds with the interface of grooves 245a and 245b and includes spans 248a and 248b. FIG. 7 shows the spoke 246 and connectors 244a and 244b prior to their assembly. Connectors 244a and 244b are subsequently joined together in respective directions 249a and 249b in a manner previously described in FIGS. 3a-e, with a joining interface between surfaces 240a and 240b and between 242a and 242b, to create an integral joinder between connectors 244a and 244b and to provide a laterally captured connection with the spoke 246.

It should be noted that in FIG. 7 spoke 246 does not have an enlarged portion or a headed or an enlarged portion and is shown here to be a generally smooth element, with no engaging surface to limit its longitudinal movement relative to connectors 244a and 244b. As such, the spoke 246 may be gripped within grooves 245a and 245b to provide a tensile connection with the joined connectors 244a and 244b. Alternatively, the spoke 246 may be allowed to slip or move within grooves 245a and 245b along its longitudinal axis, without a tensile connection with the joined connectors 244a and 244b. In such a case, the connector assembly would have a laterally retained engagement with the spoke, without a tensile engagement.

It should also be noted that, while spoke 246 is shown to be a generally straight element, it is also envisioned that it may alternatively include a bent or curved portion. For example, grooves 245a and 245b may alternatively be curved grooves, with a curved portion in a region coincident with a curved portion of the spoke. Still further, the spoke 246 may include a bent or curved portion that is external to the region of its engagement with connectors 244a and 244b.

Figure 8A:
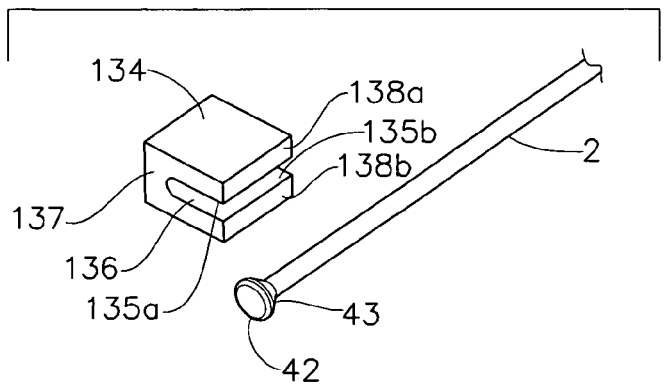
FIG. 8a is an exploded perspective view of a sixth embodiment of the present invention, showing a spoke loosely positioned within the one-piece connector.
Figure 8B:
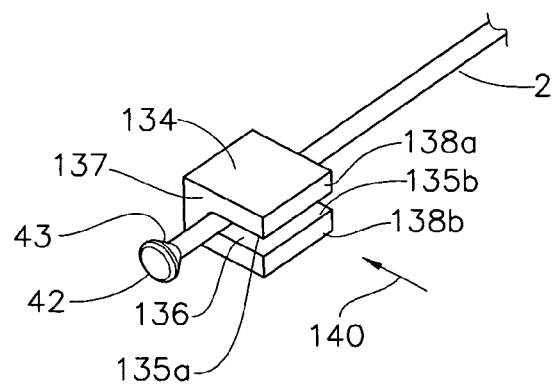
FIG. 8b is a perspective view of the embodiment of FIG. 8a, showing the spoke loosely pre-assembled to the connector.

FIGS. 8a-d describes an embodiment similar to the embodiment of FIGS. 6a-d, however instead of deforming tabs 118a and 118b to enclose the groove 116 around the spoke 2, filler material 142 is utilized to close the groove 136. Connector 134 includes surface 137 and integral tabs 138a and 138b, with slot 136 therebetween. Tab 138a includes inboard surface 135a and tab 138b includes inboard surface 135b. Spoke 2 includes a head or enlarged portion 42, with an outwardly flaring transition portion 43 between the diameter of the spoke 2 and the diameter of the enlarged portion 42. FIG. 8a shows the connector 134 and spoke 2 prior to assembly. Next, the spoke 2 is pre-assembled to the slot 136 in direction 140, as shown in FIG. 8b.

Figure 8C:
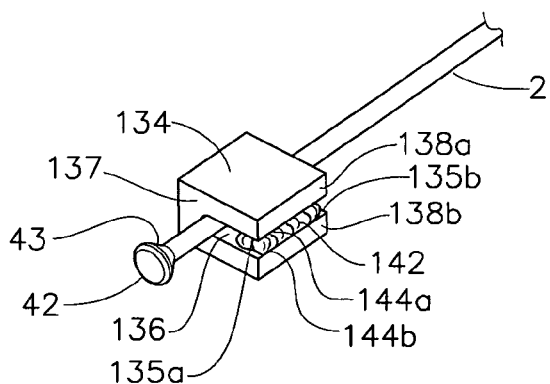
FIG. 8c is a perspective view of the embodiment of FIG. 8b, showing the spoke loosely captured within the connector by means of filler material.

With spoke 2 located within slot 136, filler material 142 is flowed into the slot 136 to create a weld bead that at least partially surrounds the cross section of the spoke 2 as shown in FIG. 8c. This filler material 142 is described here generically, however a wide range of filler materials known in industry may be utilized. For example, the filler material 142 may be comprised of metallic or polymeric weld filler, where hot molten metal or polymer is introduced to the groove 136 such that it becomes welded or otherwise integrally joined to the inboard surfaces 135a and/or 135b at joining interfaces 144a and 144b respectively. Upon subsequent cooling of the filler material 142, an integral joinder is thus created between welded filler material 142 and the connector 134. The slot 136 is now closed or is partially closed by the filler material 142 such that spoke 2 is laterally captured and/or retained within groove 136. This weld bead may be created by means of a wide range of welding methods known in industry, including MIG welding, TIG welding, arc welding, hot-air welding, etc.

Figure 8D:
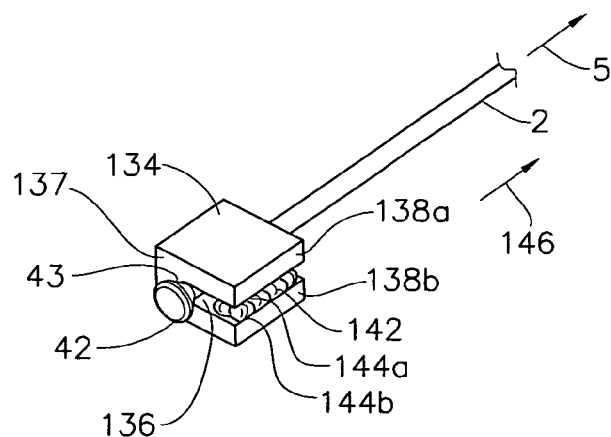
FIG. 8d is a perspective view of the embodiment of FIG. 8c, showing the spoke captured to the connector, including spoke tension.

Alternatively, in the case where the filler material 142 is adhesively bonded instead of welded to the connector 134, filler material 142 may be composed of thickened adhesive material that adheres to the inboard surfaces 135a and/or 135b, such that upon hardening of the filler material 142, an integral joinder is thus created between adhesive filler material 142 and the connector 134. Slot 136 is now closed or partially closed such that spoke 2 is laterally captured and/or retained within groove 136. Whether welded or bonded, it should be understood that, in contrast to the preceding embodiments, the filler material 142 is not pre-formed prior to its integral joinder with the connector 134; instead, the filler material 142 is slumped in place or otherwise formed in situ against the surfaces 135a and/or 135b. FIG. 8d shows the assembly of FIG. 8c with spoke tension force 5 applied to the spoke 2, drawing the spoke 2 in direction 146 through the slot 136 such that the transition portion 43 bears against surface 137 in a manner similar to that described in FIG. 6d.

The embodiment of FIGS. 9a-f is similar to several of the previous embodiments and has particular similarity to the embodiment of FIGS. 5a-d, since both of these embodiments utilize connecting elements that are deformed against the spoke to conform to the spoke's contours. Duplex spoke 98 is similar to that used in the embodiment of FIGS. 5a-d and incorporates two structural spans 100a and 100b, with a common portion 102 therebetween and a longitudinal axis 23. Each span 100a and 100b extends between two bracing elements. The common portion 102 includes a configured or knurled portion 105, with a series of raised ridges 112 and relieved grooves 113 therebetween that extend in a direction generally perpendicular to the longitudinal axis 23. It should be noted that this knurled portion 105 is shown as a series of circumferential ridges and grooves, however this knurled portion may be any sort of configured surface, such as helical threads, diamond knurls or any other shape that will promote an overlying tensile engagement between the spoke 98 and the connector 154. Connector 154 includes integral tabs 158a and 158b, with slot 156 of width 157 therebetween, and bottom surface 159. Tab 158a includes inboard surface 155a and tab 158b includes inboard surface 155b. Plug 161 includes base surface 164, top surface 167, and flank surfaces 162a and 162b, with thickness 163 therebetween.

Figure 9A:
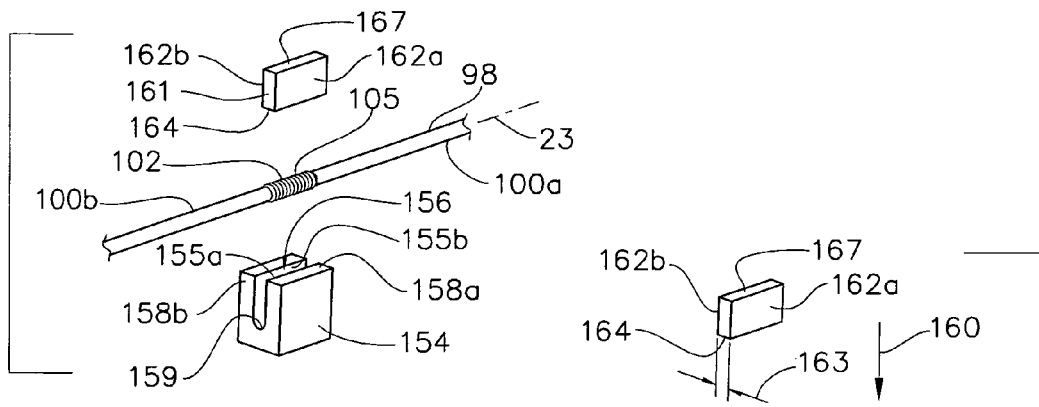
FIG. 9a is an exploded perspective view of a seventh embodiment of the present invention, showing a duplex spoke, a connector, and a plug.
Figure 9B:
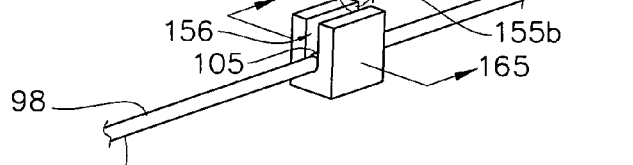
FIG. 9b is an exploded perspective view of the embodiment of FIG. 9a, showing the spoke pre-assembled to the connector.
Figure 9C:
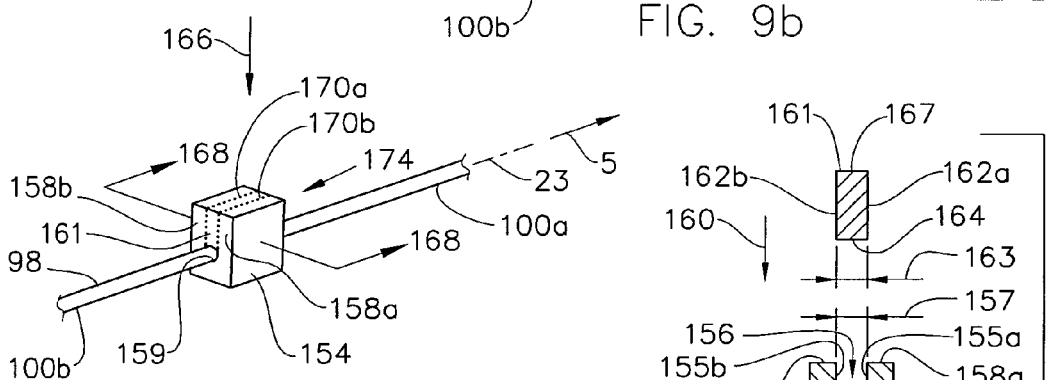
FIG. 9c is a perspective view of the embodiment of FIG. 9b, showing the plug integrally joined to the connector to capture the spoke.
Figure 9D:
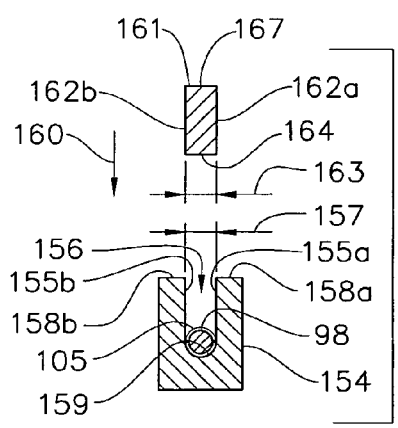
FIG. 9d is a cross-section view along 165-165 of the embodiment of FIG. 9b.
Figure 9E:
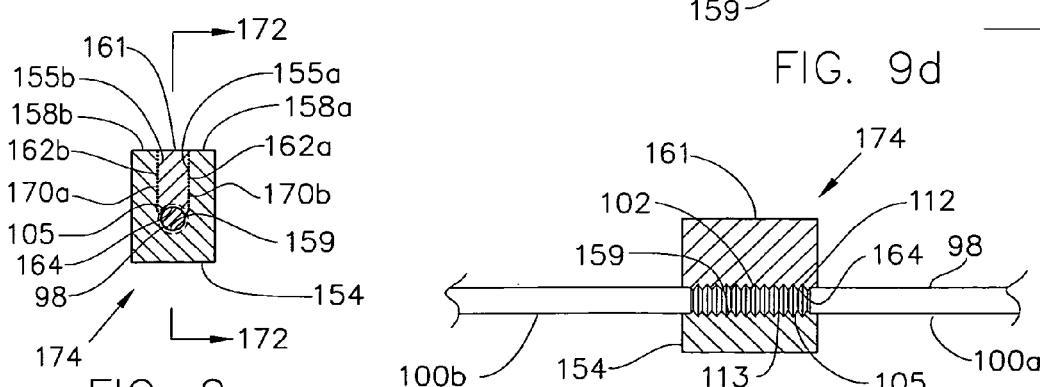
FIG. 9e is a cross-section view along 168-168 of the embodiment of FIG. 9c.
Figure 9F:
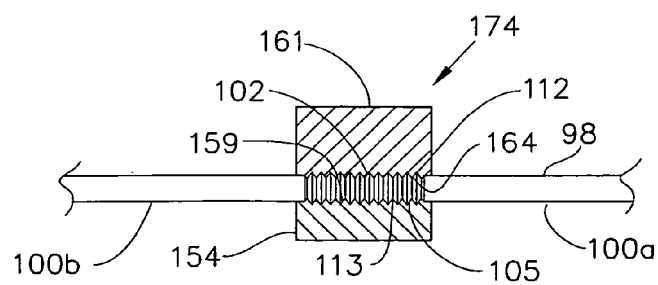
FIG. 9f is a cross-section view along 172-172 of the embodiment of FIG. 9e.

FIG. 9a shows the plug 161, connector 154 and spoke 98 in exploded view prior to assembly. Next, the spoke 2 is pre-assembled to the slot 156 in direction 160, as shown in FIGS. 9b and 9d, such that the knurled portion 105 is nested in slot 156 and contacting bottom surface 159. Next, as shown in FIGS. 9c, 9e, and 9f, plug 161 is pressed in assembly direction 166 such that it is located within slot 156, with base surface 164 bearing against knurled portion 105 and with knurled portion 105 bearing against bottom surface 159. As the plug 161 is further pressed in direction 166, both the base surface 164 and bottom surface 159 are embossed and deformed to conform to the knurled portion 105. Simultaneously inboard surface 155a of the connector may be joined to flank surface 162a of the plug 161 at joining interface 170a, with inboard surface 155b also joined to flank surface 162b at joining interface 170b. The joinder of inboard surfaces 155a and 155b with their respective flank surfaces 162a and 162b may be achieved by a variety of means, including welding and adhesive bonding to create the connector assembly 174.

In a preferred assembly method, the spoke 98 is made of stainless steel, while the connector 154 and plug 161 are made of fiber reinforced thermoplastic composite. The thickness 163 of plug 161 is of a slightly larger dimension than the width 157 of slot 156, creating an interference fit therebetween. An energized ultrasonic welding horn (not shown) is pressed against the top surface 167 of plug 161 in the assembly direction 166 as shown, driving the plug 161 into the slot 156 and melting the flank surfaces 162a and 162b and corresponding inboard surfaces 155a and 155b. This creates what is commonly referred to as a "shear weld" at joining interfaces 170a and 170b and an integral joinder is thus achieved between the plug 161 and the connector 154 to create the connector assembly 174. Simultaneously, as the plug 161 is driven into the slot 156, the base surface 164 of the plug 161 is pressed against knurled portion 105 of the spoke 98 and the knurled portion 105 is pressed against bottom surface 159. The ultrasonic energy is transferred from the horn to the plug 161 through the spoke 98 and to the bottom surface 159 of the connector, locally heating the plug 161 and the connector 154 at the interfaces where they meet the spoke 98. The base surface 164 and bottom surface 159 are softened and/or melted due to the mechanical energy provided by the horn, thus facilitating their deformation to conform and match with the surface of the knurled portion 105 of the spoke 98. When this assembly is cooled, the connector assembly 174 thus laterally captures the spoke 98. Additionally, material of the plug 161 and connector 154 is embossed and deformed to flow into the relieved 113 grooves of the knurled portion 105. Thus, the base surface 164 and bottom surface 159 have matched surfaces and an interlocked longitudinal overlie engagement with the knurled portion 105 of the spoke 98 to provide a tensile engagement between the spoke 98 and the connector assembly 174 to resist spoke tensile forces 5. Also, flank surfaces 162a and 162b are now integrally fused and welded to the corresponding inboard surfaces 155a and 155b. A firm locked connection between the spoke 98 and the connector 154 is thus achieved. It should be noted that, in this embodiment, joining interfaces 170a and 170b extend generally in a direction parallel to the assembly direction 166 and also parallel to the longitudinal axis 23.

In an alternative arrangement, where the thickness 163 of plug 161 is of a smaller dimension than the width 157 of slot 156, a gap(s) are created between inboard surfaces 155a and 155b and respective flank surfaces 162a and 162b. As such, a shear weld is not possible. In such a case, at the time when the base surface 164 and bottom surface 159 are melted as previously described, this molten material is flowed and pushed back up through these gap(s) (due to horn pressure), which serves as weld filler material to fill these gap(s) and to effectively weld surfaces 155a to 162a and 155b to 162b to create joining interfaces 170a and 170b respectively. An integral joinder between the plug 161 and the connector 154 is thus achieved.

In an alternative arrangement that includes adhesive bonding instead of welding, base surface 164 and bottom surface 159 may be preformed to include configured surfaces that are preformed to match the knurled portion 105 of the spoke 98. Such a matched surface arrangement is also shown in the embodiment of FIGS. 4a-e. The plug 161 is assembled to the slot 156 with adhesive introduced between inboard surfaces 155a and 155b and respective flank surfaces 162a and 162b. When the adhesive is fully solidified, flank surfaces 162a and 162b are now adhesively bonded to the corresponding inboard surfaces 155a and 155b. Thus the plug 161 is integrally joined to the connector 154 at joining interfaces 170a and 170b to create connector assembly 174. Additionally, knurled portion 105 is sandwiched and interlocked with base surface 164 and with bottom surface 159, providing a firm tensile engagement to anchor the spoke 98 to the connector 154.

In a still further alternative, with the plug 161 and connector 154 instead made of metallic materials, metallic welding and/or brazing methods may be utilized to firmly join the two at joining interfaces 170a and 170b. These alternatives are but a few representative examples of the numerous techniques that are known in industry to create an integral joinder between the plug 161 and the connector that will serve to provide a laterally captured and/or a tensile engagement with the spoke 98.

It is noted that connector 154 and plug 161 are both preformed elements prior to their integral joinder, although these components may deform somewhat when they are joined together around the spoke. This is in contrast to the embodiment of FIGS. 8a-d, which show the filler material 142 as being molten or semi-fluent material prior to its integral joinder with the connector 134.

Figure 9G:
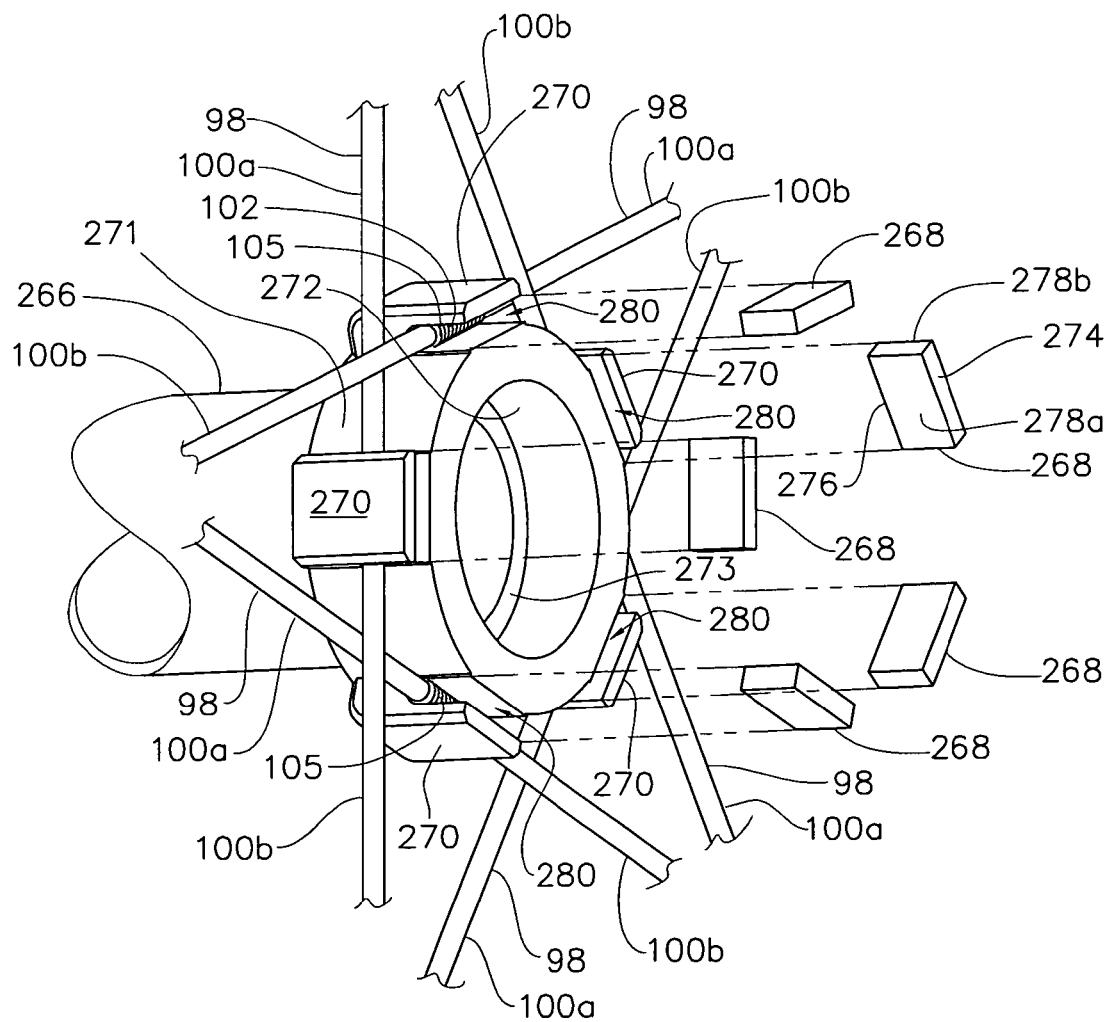
FIG. 9g is an exploded perspective view of an alternate embodiment of the present invention, corresponding to the embodiment of FIGS. 9a-f, including a vehicle wheel hub with integral connectors.

The embodiment of FIG. 9g is a representative embodiment to describe how the present invention described herein may be adapted to incorporate a multiplicity of spokes and also how the present invention may be adapted to incorporate a common bracing element, such as a rim or hub. In the embodiment of FIG. 9g, the connecting element of embodiment of FIGS. 9a-f is adapted to be integral with a vehicle wheel hub.

Duplex spoke 98 is identical to that described in FIGS. 9a-f and incorporates two structural spans 100a and 100b, with a common portion 102 therebetween. Each span 100a and 100b extends between two bracing elements. The common portion 102 includes a configured or knurled portion 105, with a series of raised edges 112 and relieved grooves 113 therebetween. Hub shell 266 includes a hub flange 271 and bearing bore 272 and shoulder 273 to accept a bearing (not shown). Hub flange 271 includes a multiplicity of integral connectors 270, each similar to the connector 154 of FIGS. 9a-f. Connectors 270 each include a slot 280 to accept the spoke 98 in a manner previously described in FIGS. 9a-f. Plugs 268 are identical to plug 161 of FIGS. 9a-f. and include base surface 276, top surface 274, and flank surfaces 278a and 278b.

FIG. 9g corresponds to FIGS. 9b and 9d and shows the spokes 98 pre-assembled to their respective connectors 270 such that the knurled portion 105 is nested in slot 280. Next, plugs 268 are assembled and joined to the hub flange 271, in the manner described in FIGS. 9c and 9e-f, with plugs 268 located within their respective slots 280. Plugs 268 may be sequentially joined to their respective slots 280 in separate operations as described above or, as may be preferable, the full complement of plugs 268 may be simultaneously joined to their respective slots 280 in a single operation. Further, while the plugs 268 are shown here as individual elements, alternatively it may be preferable that the plugs 268 are all joined to each other with an additional web of material therebetween to create a ring of plugs. For example, in a variation on the ultrasonic assembly described in FIGS. 9a-f, a single ultrasonic horn may simultaneously bear against the full complement of top surfaces 274, thereby pressing and welding the plugs 268 to their respective connectors 270 to create the full series of integral joinders as described hereinabove.

Figure 9H:
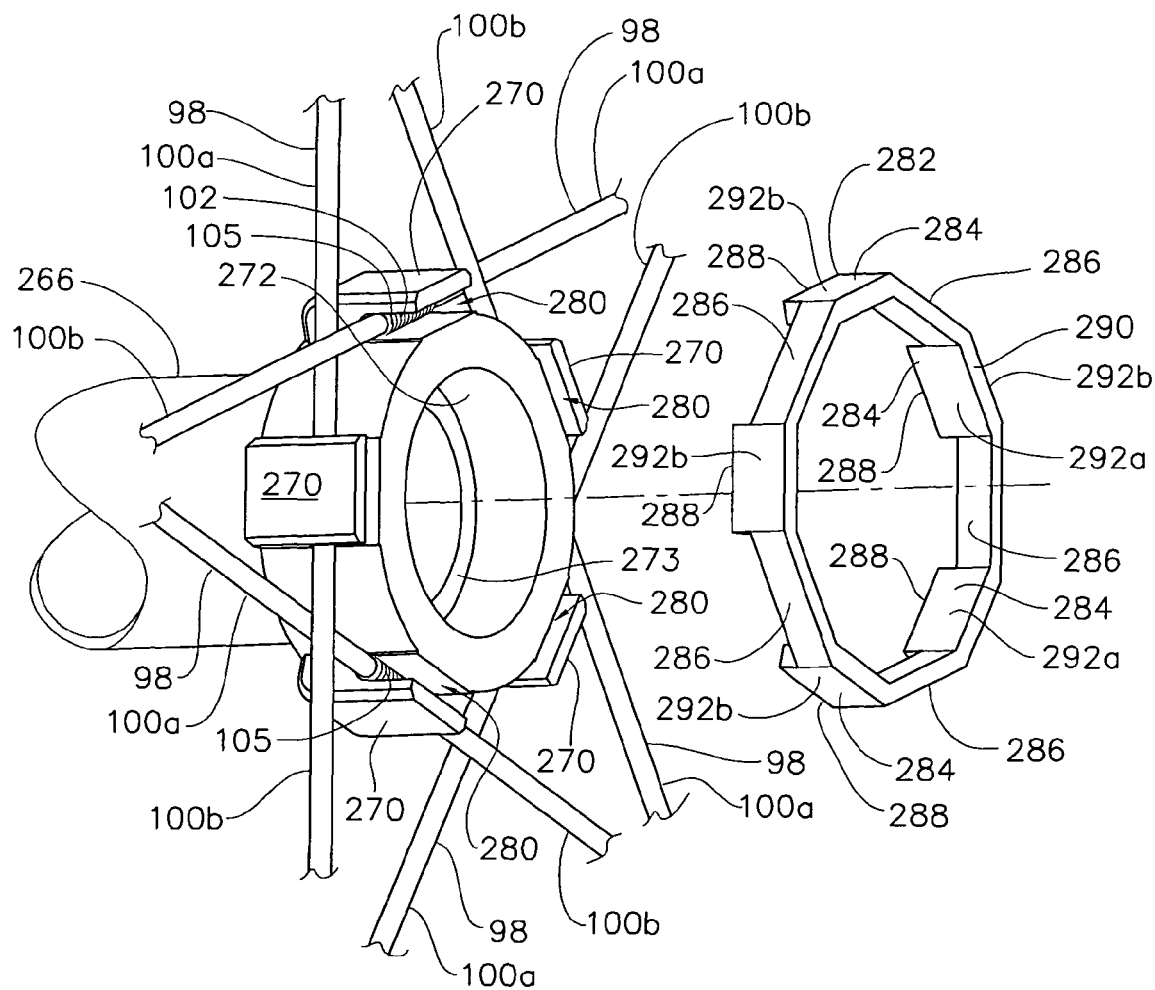
FIG. 9h is an exploded perspective view of an alternate embodiment of the present invention, showing the embodiment of FIG. 9g, including a connector ring.

FIG. 9h is identical to FIG. 9g, however the multiplicity of individual plugs 268 are eliminated in favor of a single ring 282 component. Ring 282 includes a series of plug portions 284 interspersed with a series of extensions 286 to create a continuous ring where the individual plugs of FIG. 9g are instead all connected together by extensions 286. Plug portions 284 include base surface 288, top surface 290, and flank surfaces 292a and 292b. The plug portions 284 serve the same function as plugs 268 to create an integral joinder with their mating connectors 270 as previously described, thus resulting in a laterally captured tensile engagement between the spoke 98 and the connector 270. The extensions 286 serve to retain all of the plug portions 284 together, thereby simplifying the handling and assembly of these components in comparison with the arrangement of FIG. 9g.

For the purposes of using conventional terminology, the term "hub flange" is used herein to describe a region of the hub shell 266 to which the spokes 98 are joined. While the surface of the hub flange may be raised and flange-like in comparison to other surfaces of the hub shell 266, this is not a requirement for the present invention, and the hub flange 271 may alternatively be flush or recessed relative to other hub shell surfaces.

Figure 10A:
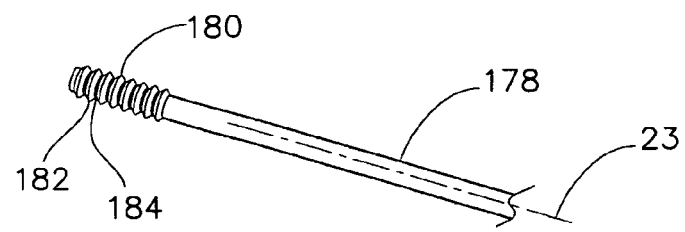
FIG. 10a is a perspective view of a spoke of the present invention, including a knurled surface for interface with a connecting element (not shown)
Figure 10B:
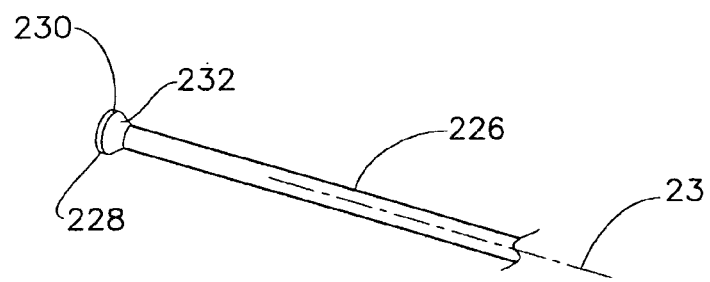
FIG. 10b is a perspective view of a spoke of the present invention, including an enlarged head for interface with a connecting element (not shown)
Figure 10C:
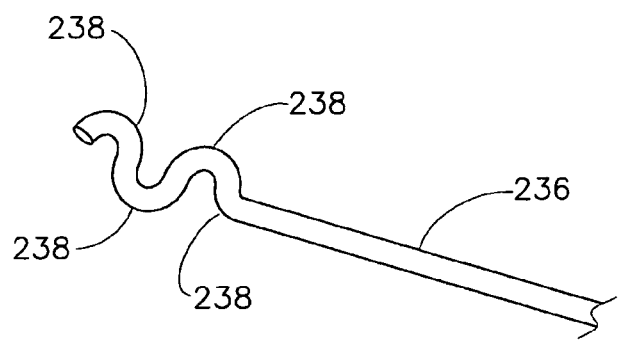
FIG. 10c is a perspective view of a spoke of the present invention, including a bent portion for interface with a connecting element (not shown)

FIGS. 10a-c describe a variety of ways that the surface of the spoke may be configured to provide overlying and/or interlocking tensile engagement with the connecting element described variously within the instant application. FIG. 10a describes a spoke 178 that is similar to the spoke 71 of FIGS. 4a-d and includes a configured surface 180 with a series of longitudinally spaced raised ribs 182 and series of relieved grooves 184 therebetween. These raised ribs 182 may be considered to be raised edges and these raised ribs also extend in a direction generally perpendicular to the longitudinal axis 23 of the spoke 178 as shown. It should be noted that the cross section geometry of the spoke 178 is variable within the configured portion 180.

The spoke 226 of FIG. 10b is similar the spoke 2 of FIGS. 3a-e, with a configured portion 228 that includes an enlarged head 230 with a transition portion 232 between the diameter of the spoke 226 and the enlarged head 230. In this respect, the configured portion 228 may be considered to be similar to the configured portion 180, however the configured portion 228 has only a single raised portion and a single relieved portion. This raised portion may be considered to be a raised edge, which extends in a direction generally perpendicular to the longitudinal axis 23 of the spoke 226 as shown.

The spoke 236 of FIG. 10c has a configured portion constituting bent regions 238 as shown. Bent regions 238 include a series of "S"-shaped bends to create an overlying engagement with the clamping member (not shown) as previously described. It should be noted that the cross section geometry of the spoke 236 is generally constant within the configured bent region 238.

Figure 10D:
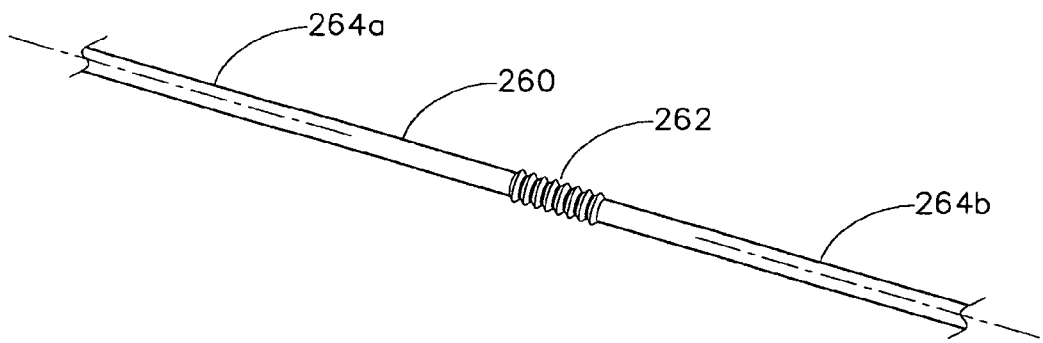
FIG. 10d is a perspective view of a duplex spoke of the present invention, including a knurled surface for interface with a connecting element (not shown) and two portions.

FIG. 10d describes a spoke 260 that is similar to spoke 98 of FIGS. 5a-d and includes a configured surface 262 located at a midpoint along spoke 260, in contrast to the end of the spoke as previously described in FIG. 10a. By locating the configured portion 262 at some midpoint along the length of the spoke 260, a duplex spoke 260 may be created, which incorporates two structural spans 264a and 264b, with each span extending between two bracing elements. Thus, for example, the configured portion 262 may be engaged at the hub flange (not shown), with a first span 264a extending to one point of the outer rim (not shown) and a second span 264b extending to another point in the outer rim.

FIGS. 11a-c describe an embodiment similar to the embodiment of FIGS. 3a-e, however this embodiment also includes an intermediate element between the spoke and the connector assembly. Connector 198a includes groove 202a, faces 199a and 200a and joining surfaces 204a and 206a. Similarly, connector 198b includes groove 202b, faces 199b and 200b and joining surfaces 204b and 206b. Spoke 2 includes longitudinal axis 23 and a head or enlarged portion 42, with an outwardly flaring transition portion 43 between the diameter of the spoke 2 and the diameter of the enlarged portion 42. Intermediate element 190 includes a cylindrical sleeve 192, with annular flanges 194a and 194b located at either end. Intermediate element also includes a central hole 196 therethrough and chamfered edge 201 to accept the spoke 2 as shown.

FIG. 11a shows the spoke 2 and connectors 198a and 198b prior to their assembly, including the intermediate element 190 aligned with slots 202a and 202b and spoke 2 piloted within the intermediate element 190. FIG. 11b shows connectors 198a and 198b assembled together in directions 208a and 208b respectively such that intermediate element 190 is located within grooves 202a and 202b. Joining surface 204a is now contacting joining surface 204b at the joining interface 210 where these surfaces meet. Likewise, joining surface 206a is now contacting joining surface 206b at joining interface 212. Connectors 198a and 198b are now integrally joined together at joining interfaces 210 and 212 in a manner as previously described in FIGS. 3a-e to create connector assembly 214. Flange 194b is now located against surfaces 200a and 200b and flange 194a is located against surfaces 199a and 199b, such that the intermediate element is captured by the integral joinder of connectors 198a and 198b in a tensile engagement. Spoke 2 is located within hole 196 of the intermediate element 190 to provide lateral engagement between the two. Connectors 198a and 198b are integrally joined together at joining interfaces 210 and 212, creating connector assembly 214 to capture and surround the cross section of the intermediate element 190. This joinder may be achieved by a variety of means, including welding, adhesive bonding, soldering, etc, as described hereinabove.

FIG. 11c shows the connector assembly 214 of FIG. 11b with spoke tension force 5 applied to the spoke 2, drawing the spoke 2 through the hole 196 of the intermediate element 192 such that the transition portion 43 bears against the chamfered edge 201. An overlie engagement between the spoke 2 and the connector assembly 214 is achieved such that the spoke 2 is firmly anchored to the connector assembly 60 214 to resist spoke tension force 5. Thus it may be seen that the spoke 2 is connected to the connector assembly via the intermediate element 190. While this embodiment shows a generic intermediate element, a wide range of alternate configurations are envisioned where a connector assembly includes a joinder to capture an intermediate element 190 that is, in turn, connected to a spoke. It may be seen that the intermediate element 190 has a laterally captured and a tensile engagement with the connector assembly 214. Similarly, the spoke 2 has a laterally captured and a tensile engagement with the intermediate element 190.

Figure 12A:
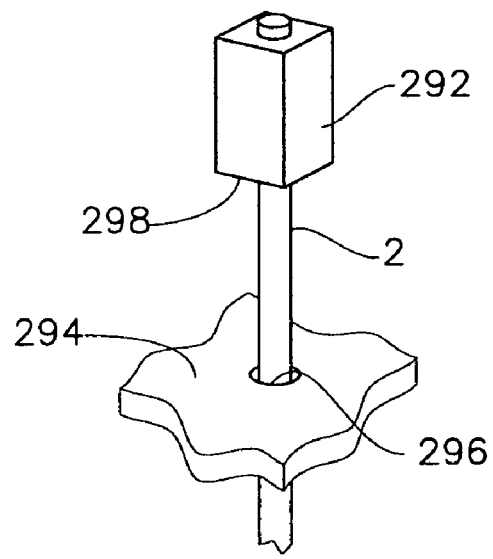
FIG. 12a is a partial perspective exploded view of a ninth embodiment of the present invention, and showing the spoke passing through a hole in a bracing element, including a connector assembly joined to the spoke.
Figure 12B:
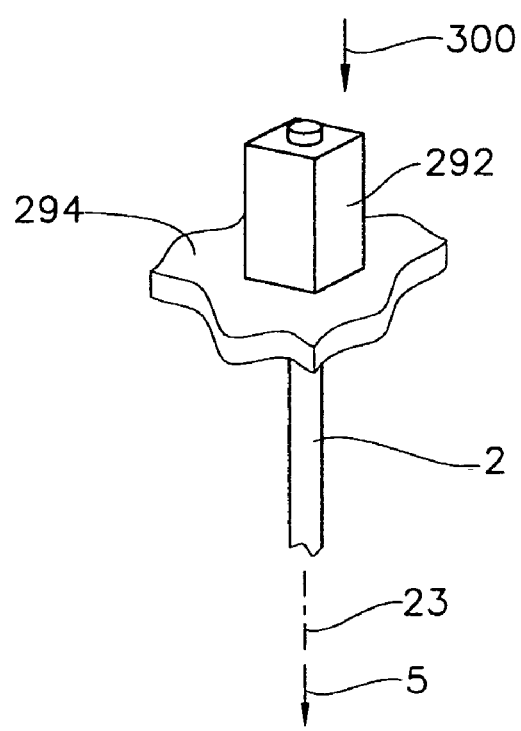
FIG. 12b is a partial perspective view of the embodiment of FIG. 12a, and showing the connector assembly and an overlie engagement between the connector assembly and the bracing element.

FIGS. 12a-b describe one example of how a longitudinal tensile element, such as a spoke 2, may be anchored against a bracing element. Spoke 2 includes connector assembly 292 connected thereto, with downward facing bearing surface 298. It may be viewed that connector assembly 292 serves as an enlarged portion to the spoke 2 and bearing surface 298 serves as a transition surface. There are several embodiments disclosed herein that describe means for connecting an anchoring element, such as connector assembly 292, to the spoke 2, several of which may be applied to the embodiments described herein. Bracing element 294 includes hole 296, through which the spoke 2 is extended to pass. The bracing element 294 is representative of the spoke bed of a rim or a portion of a hub flange to which the spoke 2 is connected. The connector assembly 292 is shown here as a representative element that may correspond to any of the connectors or connector assemblies described herein. With the application of spoke tension force 5 along the longitudinal axis 23, the spoke 2 is drawn in direction 300 so that bearing surface 298 overlies and bears against bracing element 294, as shown in FIG. 12b. Thus the spoke 2 is firmly anchored against the bracing element 294 by means of the connector assembly 292. Of course, any manner of intermediate elements may be utilized between the spoke 2 and the bracing element 294 to optimize the interface between these two components. For example, it may be desirable to incorporate a flat washer between the bearing surface 298 and the bracing element 294 to distribute the contact forces over a broader surface area of the bracing element 294.

Figure 13A:
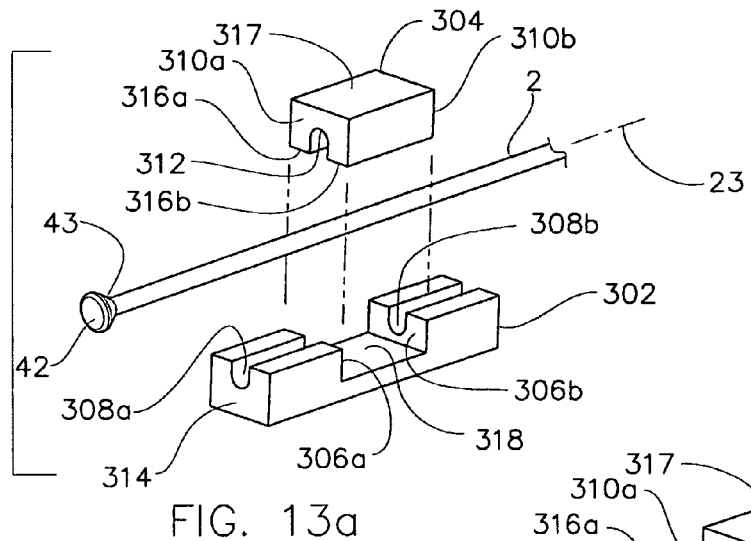
FIG. 13a is an exploded perspective view of a tenth embodiment of the present invention, showing a spoke loosely aligned between a two-piece connector.

FIGS. 13a-d describe an embodiment similar to the embodiments of FIGS. 3a-d and 8a-f, however the geometry of the joining interface is somewhat reconfigured. The embodiment of FIGS. 13a-d shows a connecting element composed of two pre-formed connectors assembled together as shown. FIG. 13a shows the components in exploded view, prior to their integral joinder. Connector 302 includes aligned grooves 308a and 308b, end face 314 and longitudinally opposed joining surfaces 306a and 306a and floor surface 318. Cover 304 includes groove 312, face 317, base surfaces 316a and 316b, and longitudinally opposed joining surfaces 310a and 310b. Joining surfaces 306a and 306b are spaced by distance 320 and joining surfaces 310a and 310b are spaced by distance 322. Spoke 2 includes longitudinal axis 23 and a head or enlarged portion 42, with an outwardly flaring transition portion 43 between the diameter of the spoke 2 and the diameter of the enlarged portion 42.

Figure 13B:
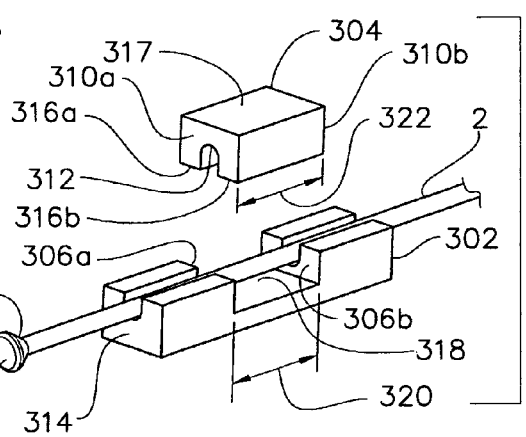
FIG. 13b is an exploded perspective view of the embodiment of FIG. 13a, showing the spoke loosely pre-assembled to the connector.
Figure 13C:
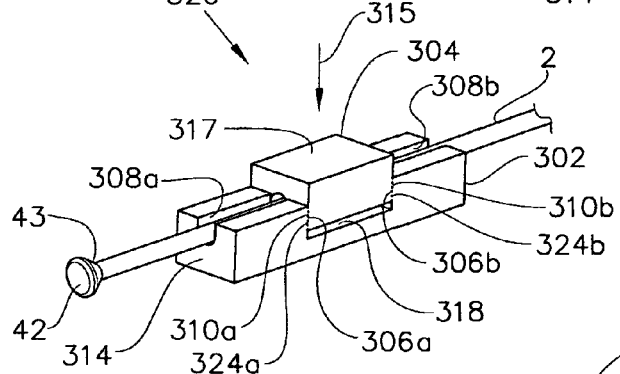
FIG. 13c is a perspective view of the embodiment of FIG. 13b, showing the cover integrally joined to the connector.

The spoke 2 is first nested in grooves 308a and 308b as shown in FIG. 13b. Next, the cover 304 is joined to the connector 302 in assembly direction 315, with joining surfaces 306a and 306b integrally joined to corresponding joining surfaces 310a and 310b at their respective joining interfaces 324a and 324b to create connector assembly 326 as shown in FIG. 13c. It should be noted that, in this embodiment, joining interfaces 324a and 324b extend generally in a direction parallel to the assembly direction 315 and perpendicular to the longitudinal axis 23.

In an exemplary method, connector 302 and cover 304 are both made of fiber reinforced thermoplastic polymer resin and distance 322 is slightly wider than distance 320 to create an interference fit therebetween. With the connector 302 supported in a nest (not shown), an energized ultrasonic horn (not shown) is pressed against face 317 in assembly direction 315, pressing the cover 304 into the connector 302, with joining faces 310a and 310b shearing past mating joining faces 306a and 306b in a shear welding configuration to create a welded joinder therebetween at joining interfaces 324a and 324b. While it is envisioned that the base surfaces 316a and 316b may also be simultaneously welded to floor surface 318, this embodiment shows a non-welded gap 320 between these surfaces.

Figure 13D:
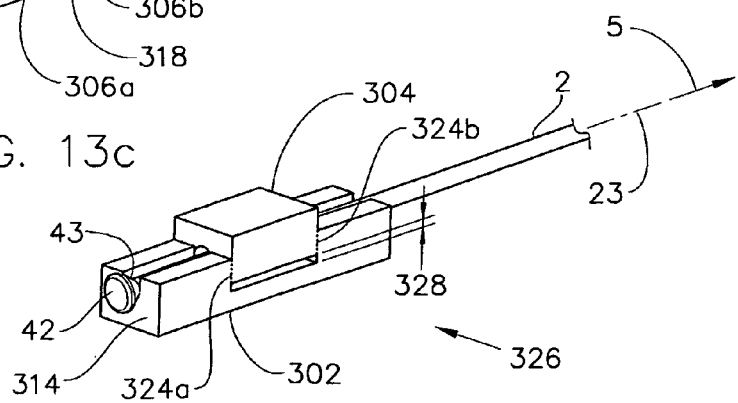
FIG. 13d is a perspective view of the embodiment of FIG. 13c, showing the spoke engaged to the connector, including spoke tension.

Next, tensile force 5 is applied to the spoke 2, drawing the spoke along the longitudinal axis 23 until the transition portion 43 bears against the end face 314 adjacent the groove 308a as shown in FIG. 13d. Thus, an overlie engagement is achieved between the spoke 2 and the connector assembly 326 to support spoke tensile forces 5. It should also be noted that, in contrast to the embodiment of FIGS. 3a-d where the transition portion 43 bears against two portions (connectors 44a and 44b) of the connector assembly 60, this embodiment shows the transition portion 43 bears against only one portion (connector 302) of the connector assembly 326. Thus cover 304 serves to retain the spoke 2 to the connector 302 by preventing the spoke 2 from being displaced laterally and thereby maintaining the tensile engagement with the connector 302.

While my above description contains many specificities, these should not be construed as limitations on the scope of the invention, but rather as exemplifications of embodiments thereof. For example:

While the embodiments shown herein utilize a connecting element (i.e. connector assembly) that wraps around the full cross section of the spoke to laterally capture the spoke around its full circumference, it is also envisioned that the connector assembly may alternatively wrap only partially around cross section of spoke to provide the laterally captured engagement. In this case, it is preferable that the connecting element provide enough of a wrap circumference to create an overlie engagement with the spoke to retain the spoke in the lateral direction (perpendicular to the longitudinal axis).

While techniques for ultrasonic welding and adhesive bonding, have been discussed herein in more detail, there exist a wide range of integral joining methods that may be utilized to create the integral joinder. Some alternative welding methods include vibration welding, flat-plate welding, spin welding, laser welding, induction welding, resistance welding, arc welding, gas welding, among others. In addition, some further candidate joining methods include soldering, brazing, adhesive bonding, among others.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications that are within its spirit and scope as defined by the claims.

Thus, the present invention provides a vehicle wheel that is inexpensive to produce, lends itself easily to high-volume manufacturing methods, is light in weight and is strong and reliable. Further, the present invention reduces the amount of labor required to assemble the wheel. Further still, the present invention reduces component cost through the use of lower-cost materials and by utilizing net-shape hub forming operations to reduce scrap and fabrication expense. Further still, the present invention reduces wheel weight by facilitating the utilization of light weight hub materials, by allowing greater freedom in hub flange detail and geometry to optimize the design. Yet further, the present invention increases the strength and reliability of the wheel by reducing stresses in components and connections and by eliminating any clearances or relative movement between the hub and spokes.

What is claimed is:

1. A wheel, comprising: a peripheral rim;
a central hub with a central axle and an outer flange;
a plurality of spokes extending between said peripheral rim and said central hub,
a connecting element connected to at least one of said spokes;
a bracing element connected to said connecting element;
wherein said spokes have a first portion connected to said peripheral rim and a second portion opposed to said first portion and connected to said central hub and a span portion between said peripheral rim and said central hub;
wherein said spoke has a tensile axis of applied tensile load along said span portion and lateral geometry that projects generally laterally from said tensile axis;
wherein said spoke has a length greater than its cross sectional width and a longitudinal axis along its length;
wherein said bracing element includes at least a portion of at least one of said rim and hub;
wherein said connecting element includes a pre-formed first portion and a second portion and wherein said pre-formed first portion is integrally joined to said second portion at a joining interface;
wherein said integral joinder of said first portion and said second portion of said connecting element serves to at least one of retain and engage said spoke to said connecting element;
wherein said integral joinder of said first portion and said second portion of said connecting element serves to provide a tensile engagement to limit relative movement between said spoke and said connecting element in the direction of said longitudinal axis; and
Wherein said tensile engagement includes a mechanical overlie engagement between said lateral geometry and said connecting element to limit relative movement between said spoke to said connecting element in a direction generally along said tensile axis.

2. A wheel according to claim 1, wherein said integral joinder serves to provide a laterally captured engagement to limit relative movement between said spoke, and said connecting element in the direction perpendicular to said longitudinal axis.

3. A wheel according to claim 1, wherein said integral joinder provides both a tensile engagement to limit relative movement between said spoke and said connecting element in the direction of said longitudinal axis and a laterally captured engagement to limit relative movement between said spoke and said connecting element in the direction perpendicular to said longitudinal axis.

4. A wheel according to claim 1, wherein said overlie engagement is a longitudinal overlie engagement, including a multiplicity of said overlie engagements extending along said longitudinal axis over a longitudinal distance.

5. A wheel according to claim 4, wherein said spoke has a cross sectional thickness and wherein said longitudinal distance is at least twice said cross sectional thickness.

6. A wheel according to claim 1, wherein said integral joinder of said first portion and said second portion of said connecting element comprises a fused or welded joinder at said joining interface.

7. A wheel according to claim 1, wherein said integral joinder of said first portion and said second portion of said connecting element comprises an adhered or adhesively bonded joinder at said joining interface.

8. A wheel according to claim 1, wherein said first portion and said second portion of said connecting element are assembled to each other in an assembly direction and wherein said joining interface extends in a direction that is generally perpendicular to said assembly direction and generally parallel to said longitudinal axis.

9. A wheel according to claim 1, wherein said first portion and said second portion of said connecting element are assembled to each other in an assembly direction and wherein said joining interface extends in a direction that is generally parallel to said assembly direction and perpendicular to said longitudinal axis.

10. A wheel according to claim 1, wherein said first portion and said second portion of said connecting element are assembled to each other in an assembly direction and wherein said assembly direction is generally perpendicular to said longitudinal axis.

11. A wheel according to claim 1, wherein said first portion of said connecting element is a first discreet pre-formed part and wherein said second portion of said connecting element is a second discreet pre-formed part and wherein said integral joinder is between said first pre-formed part and said second pre-formed part.

12. A wheel according to claim 1, wherein at least a portion of said connecting element comprises a singular pre-formed part that includes both said first portion and said second portion and wherein said integral joinder is between said first portion and said second portion.

13. A wheel according to claim 1, wherein said first portion of said connecting element is a pre-formed part and wherein said second portion is formed in situ against said first portion and wherein said integral joinder is between said first portion and said second portion.

14. A wheel according to claim 1, wherein said connecting element is deformed by said spoke in a deformed region.

15. A wheel according to claim 14, including an interlocked connection between said deformed region of said connecting element and said spoke.

16. A wheel according to claim 15, wherein said interlocked connection provides a tensile engagement to limit relative movement between said connecting element and said spoke in a direction generally parallel to said longitudinal axis.

17. A wheel according to claim 1, wherein said spoke is a pre-formed element that includes a configured surface and wherein at least a portion of said connecting element is a pre-formed element that includes a configured surface and wherein, upon said integral joinder, said configured surface of said spoke is engaged to interlock said configured surface of said connecting element to limit relative movement between said spoke to said connecting element in a direction generally parallel to said longitudinal axis.

18. A wheel according to claim 1, wherein said spoke is a pre-formed element that includes a configured surface and wherein at least a portion of said connecting element is a pre-formed element and wherein, upon said integral joinder, said connecting element is deformed to conform to said configured surface of said spoke in a deformed connection such that said connecting element is engaged to interlock said configured surface of said spoke to limit relative movement between said spoke to said connecting element in a direction generally along said longitudinal axis.

19. A wheel according to claim 18, wherein said deformed connection includes plastic deformation of said connecting element.

20. A wheel according to claim 1, wherein said connecting element is integral with said bracing element.

21. A wheel according to claim 20, wherein said bracing element is at least a portion of said central hub.

22. A wheel according to claim 1, wherein said connecting element is a discreet element that is connected to said bracing element.

23. A wheel according to claim 1, wherein said connecting element fully surrounds the cross section of said spoke.

24. A wheel according to claim 1, wherein said connecting element only partially surrounds the cross section of said spoke.

25. A wheel according to claim 1, including an intermediate element, wherein said spoke is connected to said intermediate element and said intermediate element is connected to said connecting element.

26. A wheel according to claim 25, wherein at least one of (1) said intermediate element includes an overlie engagement with said spoke to limit relative movement between said intermediate element and said spoke and (2) said intermediate element includes an overlie engagement with said connecting element to limit relative movement between said intermediate element and said connecting element.

27. A wheel according to claim 1, wherein said integral joinder is created under pressure, with said first portion pressed against said second portion at said joining interface.

28. A wheel according to claim 1, wherein said joining interface is a surface interface, wherein a surface of said first portion is integrally joined to a mating surface of said second portion.

29. A wheel, comprising: a peripheral rim;
a central hub with a central axle and an outer flange;
a plurality of spokes extending between said peripheral rim and said central hub,
a connecting element connected to at least one of said spokes;
a bracing element connected to said connecting element;
wherein said spokes have a first portion connected to said peripheral rim and a second portion opposed to said first portion and connected to said central hub and a span portion between said peripheral rim and said central hub;
wherein said spoke has a tensile axis of applied tensile load along said span portion;
wherein said spoke has a length greater than its cross sectional width and a longitudinal axis along its length;
wherein said bracing element includes at least a portion of at least one of said rim and hub;
wherein said connecting element includes a first portion and a second portion and wherein said first portion is integrally joined to said second portion at a joining interface; and
wherein said integral joinder of said first portion and said second portion of said connecting element serves to at least one of retain and engage said spoke to said connecting element; and
wherein said first portion and said second portion of said connecting element are assembled to each other in an assembly direction and wherein said joining interface extends in a direction that is generally parallel to said assembly direction and perpendicular to said longitudinal axis.

30. A wheel, comprising: a peripheral rim;
a central hub with a central axle and an outer flange;
a plurality of spokes extending between said peripheral rim and said central hub,
a connecting element connected to at least one of said spokes;
a bracing element connected to said connecting element;
wherein said spokes have a first portion connected to said peripheral rim and a second portion opposed to said first portion and connected to said central hub and a span portion between said peripheral rim and said central hub;
wherein said spoke has a tensile axis of applied tensile load along said span portion;
wherein said spoke has a length greater than its cross sectional width and a longitudinal axis along its length;
wherein said bracing element includes at least a portion of at least one of said rim and hub;
wherein said connecting element includes a first portion and a second portion and wherein said first portion is integrally joined to said second portion at a joining interface;
wherein said integral joinder of said first portion and said second portion of said connecting element serves to at least one of retain and engage said spoke to said connecting element; and wherein said first portion and said second portion of said connecting element are assembled to each other in an assembly direction and wherein said assembly direction is generally perpendicular to said longitudinal axis.

31. A wheel, comprising: a peripheral rim;
a central hub with a central axle and an outer flange;
a plurality of spokes extending between said peripheral rim and said central hub,
a connecting element connected to at least one of said spokes;
a bracing element connected to said connecting element;
wherein said spokes have a first portion connected to said peripheral rim and a second portion opposed to said first portion and connected to said central hub and a span portion between said peripheral rim and said central hub;
wherein said spoke has a tensile axis of applied tensile load along said span portion;
wherein said spoke has a length greater than its cross sectional width and a longitudinal axis along its length;
wherein said bracing element includes at least a portion of at least one of said rim and hub;
wherein said connecting element includes a pre-formed first portion and a second portion and wherein said pre-formed first portion is integrally joined to said second portion at a joining interface;
wherein said integral joinder of said first portion and said second portion of said connecting element serves to at least one of retain and engage said spoke to said connecting element; and
wherein said first portion of said connecting element is a first discreet pre-formed part and wherein said second portion of said connecting element is a second discreet pre-formed part and wherein said integral joinder is between said first pre-formed part and said second pre-formed part.

32. A wheel, comprising: a peripheral rim;
a central hub with a central axle and an outer flange;
a plurality of spokes extending between said peripheral rim and said central hub,
a connecting element connected to at least one of said spokes;
a bracing element connected to said connecting element;
wherein said spokes have a first portion connected to said peripheral rim and a second portion opposed to said first portion and connected to said central hub and a span portion between said peripheral rim and said central hub;
wherein said spoke has a tensile axis of applied tensile load along said span portion;
wherein said spoke has a length greater than its cross sectional width and a longitudinal axis along its length;
wherein said bracing element includes at least a portion of at least one of said rim and hub;
wherein said connecting element includes a pre-formed first portion and a second portion and wherein said pre-formed first portion is integrally joined to said second portion at a joining interface;
wherein said integral joinder of said first portion and said second portion of said connecting element serves to at least one of retain and engage said spoke to said connecting element;
wherein said integral joinder of said first portion and said second portion of said connecting element is at an integral joining interface between said first portion and said second portion, and wherein said spoke is included therebetween; and
wherein said integral joining interface occurs solely between said first portion and said second portion.

* * * * *